(12) United States Patent
Visharam et al.

(10) Patent No.: US 8,392,615 B2
(45) Date of Patent: Mar. 5, 2013

(54) DYNAMIC VARIABLE RATE MEDIA DELIVERY SYSTEM

(75) Inventors: Zubair Visharam, Santa Clara, CA (US); Jaspal Kohli, Sunnyvale, CA (US); Kumar Narayanan, San Jose, CA (US); Prabakar Sundarrajan, Saratoga, CA (US); Sunil Mukundan, Chennai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/491,298

(22) Filed: Jun. 7, 2012

(65) Prior Publication Data

US 2012/0311177 A1 Dec. 6, 2012

Related U.S. Application Data

(63) Continuation of application No. 12/727,149, filed on Mar. 18, 2010, now Pat. No. 8,219,711, which is a continuation-in-part of application No. 12/624,358, filed on Nov. 23, 2009.

(60) Provisional application No. 61/117,505, filed on Nov. 24, 2008, provisional application No. 61/161,376, filed on Mar. 18, 2009, provisional application No. 61/166,423, filed on Apr. 3, 2009.

(51) Int. Cl.
*G06F 15/16* (2006.01)

(52) U.S. Cl. ......................................... 709/246

(58) Field of Classification Search ................... 709/246
See application file for complete search history.

(56) References Cited

U.S. PATENT DOCUMENTS

| | | | |
|---|---|---|---|
| 6,593,860 B2 | 7/2003 | Lai et al. | |
| 6,650,618 B1 | 11/2003 | Peng et al. | |
| 7,536,469 B2 | 5/2009 | Chou et al. | |
| 8,219,711 B2 * | 7/2012 | Visharam et al. | 709/246 |
| 2002/0029274 A1 | 3/2002 | Allen | |
| 2002/0165970 A1 | 11/2002 | Ludewig | |
| 2003/0099254 A1 | 5/2003 | Richter | |
| 2005/0267948 A1 | 12/2005 | McKinley et al. | |
| 2007/0162611 A1 | 7/2007 | Yu et al. | |
| 2008/0195748 A1 | 8/2008 | Tierney et al. | |
| 2010/0131671 A1 | 5/2010 | Kohli et al. | |
| 2010/0235542 A1 * | 9/2010 | Visharam et al. | 709/246 |

OTHER PUBLICATIONS

International Search Report and Written Opinion for PCT Patent Application No. PCT/US09/65805, dated Apr. 8, 2010, 14 pages.
International Search Report and Written Opinion for PCT Patent Application No. PCT/US10/27857, dated Apr. 30, 2010, 8 pages.

* cited by examiner

*Primary Examiner* — Brian P Whipple
(74) *Attorney, Agent, or Firm* — Harrity & Harrity, LLP

(57) ABSTRACT

A method and apparatus for dynamically transcoding and delivering variable bit rate media files delivers media files to client systems. The media server dynamically transcodes a content file to a bit rate requested by a client using an original content file or other transcoded content files. The media server can dynamically select a segment of a content file to transcode. The file format required by the client is determined and the transcoded segment is formatted to the file format. The formatted segment is delivered to the client.

20 Claims, 28 Drawing Sheets

- 10 Gbps+ per Video Switch Appliance
- Scale up with 2 VSA instead of 20 servers

2001

| FLV Header 2003 | Self contained Data Packet 2004 | Pkt Size 2005 | Self contained Data Packet 2006 | Pkt Size 2007 | | Self contained Data Packet 2008 | Pkt Size 2009 |

2002

| MP4 Header 2010 | Data Packet 2011 | Data Packet 2012 | | Data Packet 2013 |

Fig. 20

DYNAMIC VARIABLE RATE MEDIA DELIVERY SYSTEM

CROSS-REFERENCE TO RELATED APPLICATIONS

Priority Claim

This application is a continuation of U.S. application Ser. No. 12/727,149, filed Mar. 18, 2010, which is a continuation in part of U.S. application Ser. No. 12/624,358, filed Nov. 23, 2009, which claims benefit, under 35 U.S.C. 119(e), of U.S. Provisional Application Nos. 61/117,505, filed Nov. 24, 2008, 61/161,376, filed Mar. 18, 2009, and 61/166,423, filed Apr. 3, 2009. The entire contents of each of the foregoing are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure generally relates to media content delivery.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Delivery of video content over the Internet has evolved over the years. The first applications of video delivery from content servers to client computers were restricted by technology and bandwidth capacity. Video files had to be dramatically reduced in size to accommodate the low bandwidth of telephone lines. Low resolution video content had to be downloaded to a client computer in whole before the video file could be played to a user. This was due to file system limitations that required an entire file to be downloaded before the file was available in the file system and video player software only having the ability to play back complete files. Users were forced to endure long delays waiting for the video file download to complete.

Proprietary file formats and video player software were created to allow the user to view the video content as the content was being downloaded. The file was either saved or discarded after the download was complete and the user viewed the video content. This approach was highly susceptible to download delays due to bandwidth limitations, server loads, or network delays. The playback of the video content had to be periodically stopped because the video player software starved from the lack of video content to playback.

A more sophisticated method was developed that streamed the video content to the video player software. The delivery systems typically had a single bit rate video file for each video content title. The single bit rate video files were served to all users regardless of their bandwidth availability. Users with higher than normal bandwidth were penalized by being forced to view video content that was a lower quality than the bandwidth justified.

A certain amount of the video content was buffered before the user was able to playback the video content. The buffer was large enough to hold an amount of video content to mask over minor delays in video content delivery caused by bandwidth limitations, server loads, or network delays. Long delivery delays, typically a few seconds or longer, were caused by erratic last mile bandwidths. The delivery delays would starve the video player software and cause the video player software to stop the playback of the video content until delivery resumed and the buffer was sufficiently filled.

BRIEF DESCRIPTION OF THE DRAWINGS

The present invention is illustrated by way of example, and not by way of limitation, in the figures of the accompanying drawings and in which like reference numerals refer to similar elements and in which:

FIG. 20 illustrates examples of file formats that can be used by an MFD, according to a possible embodiment of the invention;

DETAILED DESCRIPTION

Figure 1:
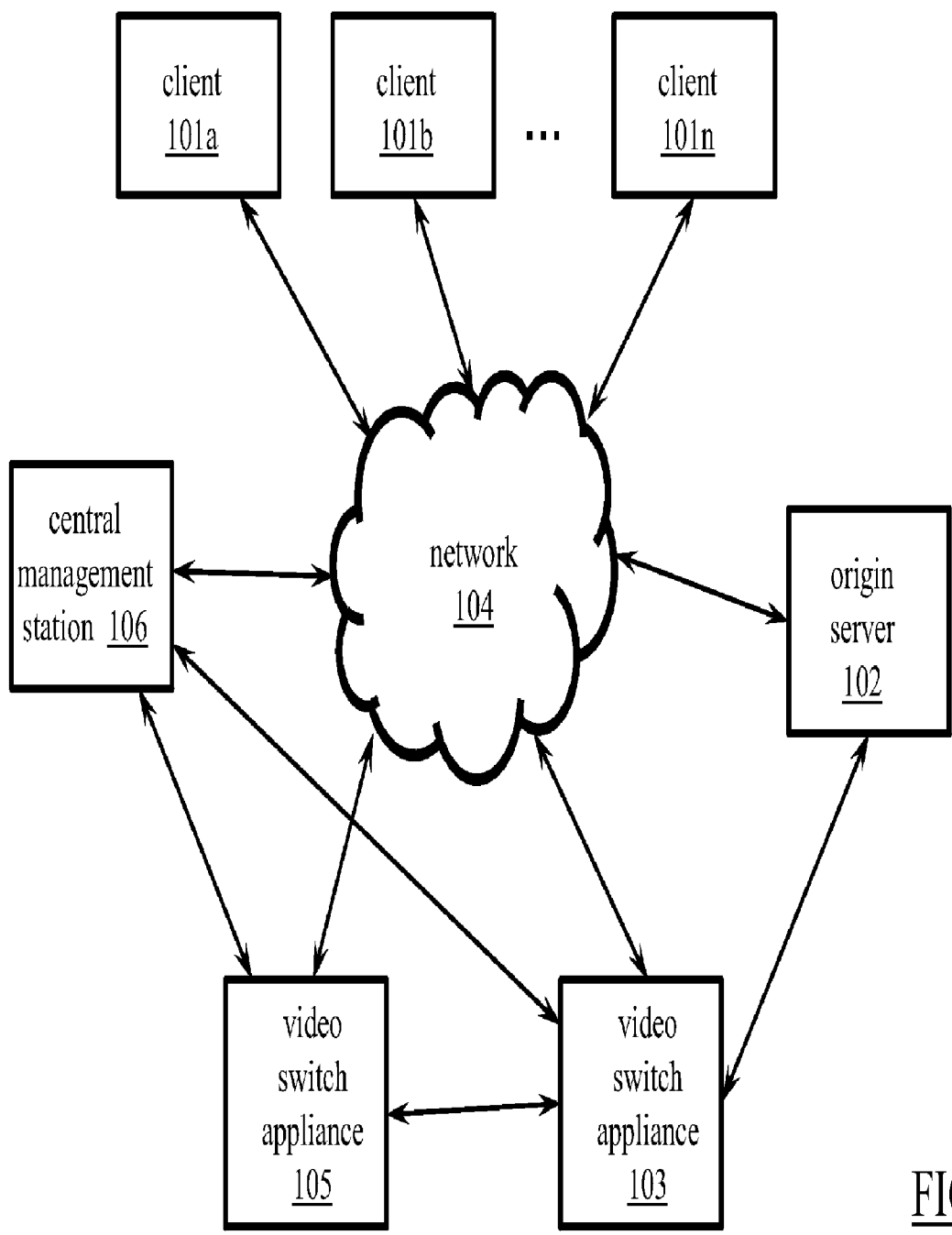
FIG. 1 illustrates a media flow director (MFD) in communication with client systems, an origin server, a peer MFD, and a central management station across a network, according to a possible embodiment of the invention.

A dynamic variable rate media delivery system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
   2.1 Adaptive Content Delivery over a Network
      2.1.1 Media Flow Director Architecture
      2.1.2 Media Flow Director Placement
   2.2 Variable Rate Media Delivery over a Network
      2.2.1 Smoothflow Architecture
      2.2.2 Transitioning Between Different Bit Rates
      2.2.3 Media Flow Director in the Network
      2.2.4 Preparing Smoothflow files
3.0 Implementation Mechanisms—Hardware Overview
4.0 Examples
5.0 Extensions and Alternatives 1.0 General Overview This overview presents a basic description of some aspects of possible embodiments of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiments in a condensed and simplified format, and should be understood as merely a conceptual prelude to a more detailed description of example possible embodiments that follows below.

A variable rate media delivery system is described. In other embodiments, the invention encompasses a computer apparatus and a computer-readable medium configured to carry out the described steps. In the text below, video content and video data are used as examples of media content and media data, but the examples are not limited to video content alone and may include other types of media content and media data, e.g., audio, multimedia presentations, slide shows, etc. The system adapts to changes in the bit rate between a server and client by delivering media data that is appropriate for the changing bit rate. In an embodiment, video data is sent to match the bandwidth between the server and client. Bandwidth between a client and server is constantly varying. At a certain point in time, there is a bit rate at which the video data has to be delivered for the video to be continuously played back by the client's video player without pauses or interruptions.

The system ensures that the client video player is never starved of data. The bandwidth between the server and client can be automatically detected and the bandwidth is mapped by the server to an appropriate video bit rate. The client video player is supplied with a steady stream of video data. The time scale is not compromised but the amount of data delivered to the client can vary to match the available bandwidth. As such, the quality of the video being played back can vary. The client player always plays the same amount of data; just the quality of the video changes.

The server seamlessly switches between video bit rates without the user and client video player seeing any interruptions. In a possible embodiment, the server can switch bit rates upon significant drops or increases in order to stop from reacting to spikes or valleys too quickly. The only noticeable change is the quality of the video being played. Standard video players can be used to interface with the server. A possible embodiment provides a video streaming experience to the user via a progressive download approach. In another possible embodiment, a video player can have the intelligence to communicate with the server using control signals or commands to enable other features of the server such as trick play features/bit rate adaptation or providing information about client side resources such as CPU usage/memory. Trick play is a feature that allows users to control their media playback experience using flow commands such as fast forward, rewind, frame step, pause, etc., on a video that is currently being streamed.

In another possible embodiment, the video player can be modified slightly to be able to send the server a control signal or command that tells the server that the video player has been paused. The pause notification allows the server to halt the progressive download to the video player. This frees up some of the bandwidth of the server and allows the server to handle other downloads.

An adaptive network content delivery system is described. Referring to FIG. 1, a possible embodiment provides a media flow director (MFD) 103. A MFD is a network device that can efficiently deliver video content (and other types of file content of various sizes, e.g., media (audio, pictures, etc.), games, software, HTML, scripts, etc.) over a network 104 to a plurality of clients 101a, 101b, 101n, via HTTP, FTP, streaming, or other protocols. Video content includes such content as feature length movies, sitcoms, variety shows, talk shows, news shows, advertisements, etc. Client devices 101*a*, 101*b*, 101*n*, may be a personal computing device such as a desktop or laptop computer, set top box, handheld computing device, cellular phone, portable media player, or any other portable device capable of displaying multimedia content, and are also coupled to network 104 through any proper interface.

The MFD 103 stores video content internally in a variety of storage devices, including HDD, SSD, RAM, non-volatile memory, etc. The MFD 103 can deliver video to a large number of clients while maintaining a high level of viewing experience for each client. The MFD 103 automatically adapts the bit rate of a video being delivered to a client 101 by measuring the client's last mile bit rate variation. The MFD provides the clients with smooth viewing of video without buffering stops. It assures delivery of in-progress videos to clients using the adaptive bit rate delivery. The MFD dynamically adapts the bit rate of the video to match the effective last mile bandwidth and to adapt to changing network conditions for the client. The MFD can dynamically measure the last mile bandwidth to the client in order to dynamically adjust the bit rate. The client does not need a custom video content player to communicate with the MFD. The MFD supports industry standard video players such as Flash, Quicktime, SilverLight, Windows Media Player, etc.

The MFD 103 provides policy controls on the storage and delivery of videos that can be defined by a customer as well as the MFD provider. The MFD can be deployed in a variety of ways across the network 104, including at an edge cache location or an origin server location. The network 104 may be implemented by any medium or mechanism that provides for the exchange of data between devices in the communication system. Examples of network 104 include, without limitation, a network such as a Local Area Network (LAN), Wide Area Network (WAN), Ethernet, intranet, the Internet, or one or more terrestrial, satellite or wireless links.

The MFD 103 communicates with network 104 through any proper communication interface, such as an Ethernet or wireless communications port. Alternatively or in addition, any number of devices connected to network 104 may also be directly connected to each other through a communications link. For example, the MFD 103 can request content from an origin server 102 via the network 104 or via a local network in order to obtain URL content when a client 101 requests a URL content that the MFD 103 does not have stored in its memory. Additionally, MFD 103 can communicate with another MFD 105 via the network 104 or via a local network in order to obtain URL content, MFD content information, MFD status, etc.

A central management station 106 may be available to allow administrators to set policies for MFD management such as cache management, bandwidth limitations, content popularity determination, etc. The central management station 106 also allows administrators to manage where and how content is stored in the multiple storage devices within a MFD. The central management station 106 may communicate via a local network or connection to MFDs 103, 105 or via network 104. An administrator logs into the central management system 106 and selects a MFD or set of MFDs that the administrator wants to interact with. The administrator can define policies and have the policies sent to a MFD or pushed out to multiple MFDs by the central management station 106. Alternatively, the MFDs may contact the central management station 106 periodically or when notified that by the central management station that updates are available for that MFD.

Figure 2:
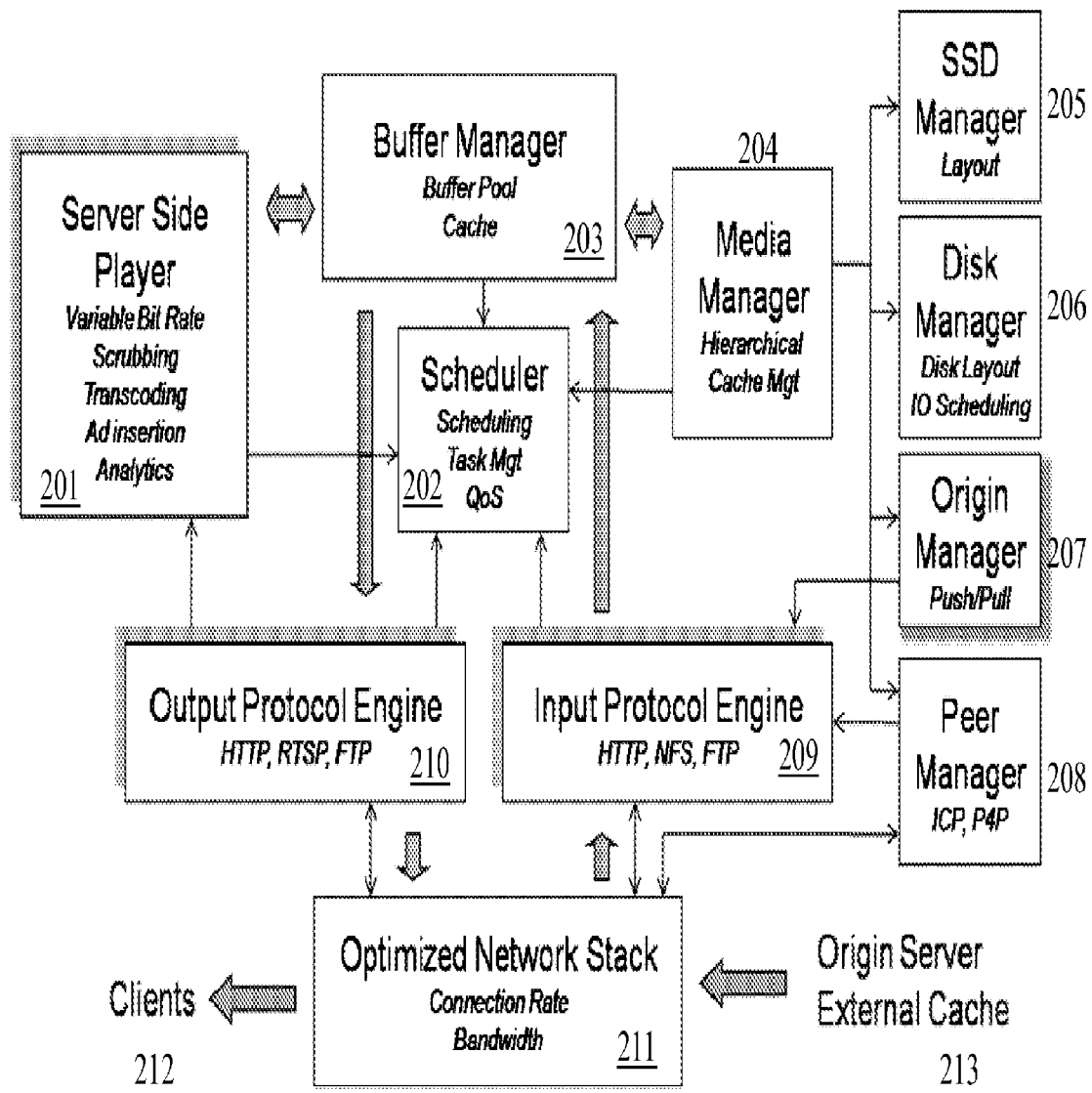
FIG. 2 illustrates an example of an MFD component and data flow architecture, according to a possible embodiment of the invention.

2.0 Structural and Functional Overview 2.1 Adaptive Content Delivery Over a Network 2.1.1 Media Flow Director Architecture FIG. 2 illustrates a possible embodiment showing the architecture of a content delivery switch that is configured as a MFD to deliver video content. The components in the architecture are described below.

Output Protocol Engine 210

The output protocol engine 210 handles requests from clients. A client sends a request to the MFD to make a connection with client, e.g., an HTTP get request for a particular URL, the output protocol engine 210 passes for requests URL content to the server side player 201.

Server Side Player 201

The server side player 201 is primarily responsible for the encapsulation and enforcement of video specific logic for each video stream. Such an enforcement could happen both at the inbound side when a request is made to the MFD for a video stream or at the outbound side when a specific video stream is heading out for delivery.

The server side player 201 interprets a URL received from the output protocol engine 210, decides what bit rate is to be used for the requested video content, handles what is to be sent, and where to play the video from (what frame within the video to start streaming from). The server side player 201 is bit rate aware and knows the bit rate of the video content that it is trying to serve. It can use information obtained from the optimized network stack 211 to find out what the effective bandwidth is for the client in the last mile. The server side player 201 can also authorize the request. In a possible embodiment, a signed hash key embedded as a query string in the URL is used to verify that the request is authorized.

The server side player 201 provides an assured bit rate and quality of service (QoS) feature. If the client has to buffer, then it means that the MFD has fallen behind in its delivery rate and the client has experienced a dead period where there is no content to play or display. In one possible embodiment, the server side player 201 calculates how much data has been sent to the client and how much time has passed. The server side player 201 tracks the amount of data sent to each client and the bit rate of the video content that each client is being sent. As each client is sent an amount of data, the server side player 201 records the amount of data that was sent and the amount of time that has passed since the last amount of data was sent. Alternatively, the server side player 201 can record the total amount of data sent to the client and the total amount of time that has passed during the client's session. Using the recorded information, the server side player 201 can calculate if it has fallen behind in its delivery to a particular client. For example, if the server side player 201 has sent 30 seconds of data at a certain bit rate to the client and 31 seconds have elapsed since the last transmission of data, the server side player 201 knows that it has fallen behind.

In another possible embodiment, the server side player 201 calculates how much more data it needs to deliver to the client and the time window that the data must be delivered in to avoid buffering on the client side. This calculation is slightly different than the previous example. The server side player 201 knows the size of the video file and thus can calculate the amount of data that remains to be sent to the client. It can also calculate the amount of time it has to deliver the remaining amount of data given the bit rate and the total size of the video file. The server side player 201 can calculate the deadline that it needs to set for a task that it creates to deliver a segment of the video file to the client.

The MFD is a task-based system that can use deadline-based scheduling. The server side player 201 sets up deadlines in the tasks that it creates in order to avoid client buffering.

In a possible embodiment, the server side player 201 calculates an assured flow rate (AFR) value (described below). The AFR is the transmission rate required to ensure a smooth viewing experience. The server side player 201 uses the AFR value to set deadlines for tasks that it creates for requesting data from the buffer manager 203. The server side player 201 calculates the AFR and the output protocol engine 210 manages the transmission rate on each connection based on the AFR and sets the task deadlines such that the AFR can be met. In the example above, the server side player 201 tries to stay ahead of the AFR and would know that it has fallen behind if, for example, the server side player 201 has sent 30 seconds of data and 30 seconds have elapsed since the last transmission, the server side player 201 immediately knows that it has fallen behind. In an alternative embodiment, the server side player 201 can scan a media file to set an AFR for the media file. The server side player 201 knows that a certain quality or resolution of the media file requires a certain transmission rate in order to ensure that the client will not stall.

The server side player 201 also handles scrubbing requests (in order to decide what to do in the future), transcoding, and ad insertion. The server side player 201 is video-aware as opposed to a typical file server that does not know what the video file format or video content is. When the server side player 201 changes the bit rate after the video has started, the server side player 201 already knows where the associated frame exists in the different bit rate version, so the server side player 201 can easily change bit rates without the client having to send a different offset for the new bit rate. A possible embodiment stores video content in a custom format that can be transcoded to any bit rate that it requires. This allows the server side player 201 to know exactly where the associated frame is for each bit rate transcoding. Another possible embodiment stores several different bit rate versions for a specific video content. The server side player 201 stores index tables for each of the bit rate versions so the server side player 201 can quickly refer to a table to find the associated frame for the new bit rate video.

The server side player 201 can perform advertisement insertion into the video streams. Ads can be placed in the video stream as overlays. This makes the ad insertion independent of the client player. The content can be dynamically created, e.g., subtitle language selection can be made on the fly and the appropriate subtitles can be overlaid on the fly. The server side player 201 can splice an ad into the middle of a video (referred to as mid-roll). The server side player 201 can also overwrite the voice channel of a video with another channel to provide multiple language support without having to store different versions of the video content.

In a possible embodiment, the server side player 201 provides two interfaces, both of which are accessed by the HTTP protocol engine (HPE) in the input protocol engine 209:

northbound interface: This serves as the northbound interface where every incoming request parsed by the HPE is examined by the server side player 201 to validate the request with its customer specific logic. Once the request is examined and the necessary parameters are enforced, the request is sent back to the HPE so that it can make a valid request to the buffer manager 203 (and other providers thereafter) for the content.

southbound interface: This serves as the southbound interface where all outgoing data is sent to server side player 201 to be examined before delivery. This is the final place where the server side player 201 can enforce any restrictions before the content is sent out for delivery. The server side player 201 has the ability at this stage to modify the data buffers returned by the buffer manager 203 if required before sending it out.

Figure 7:
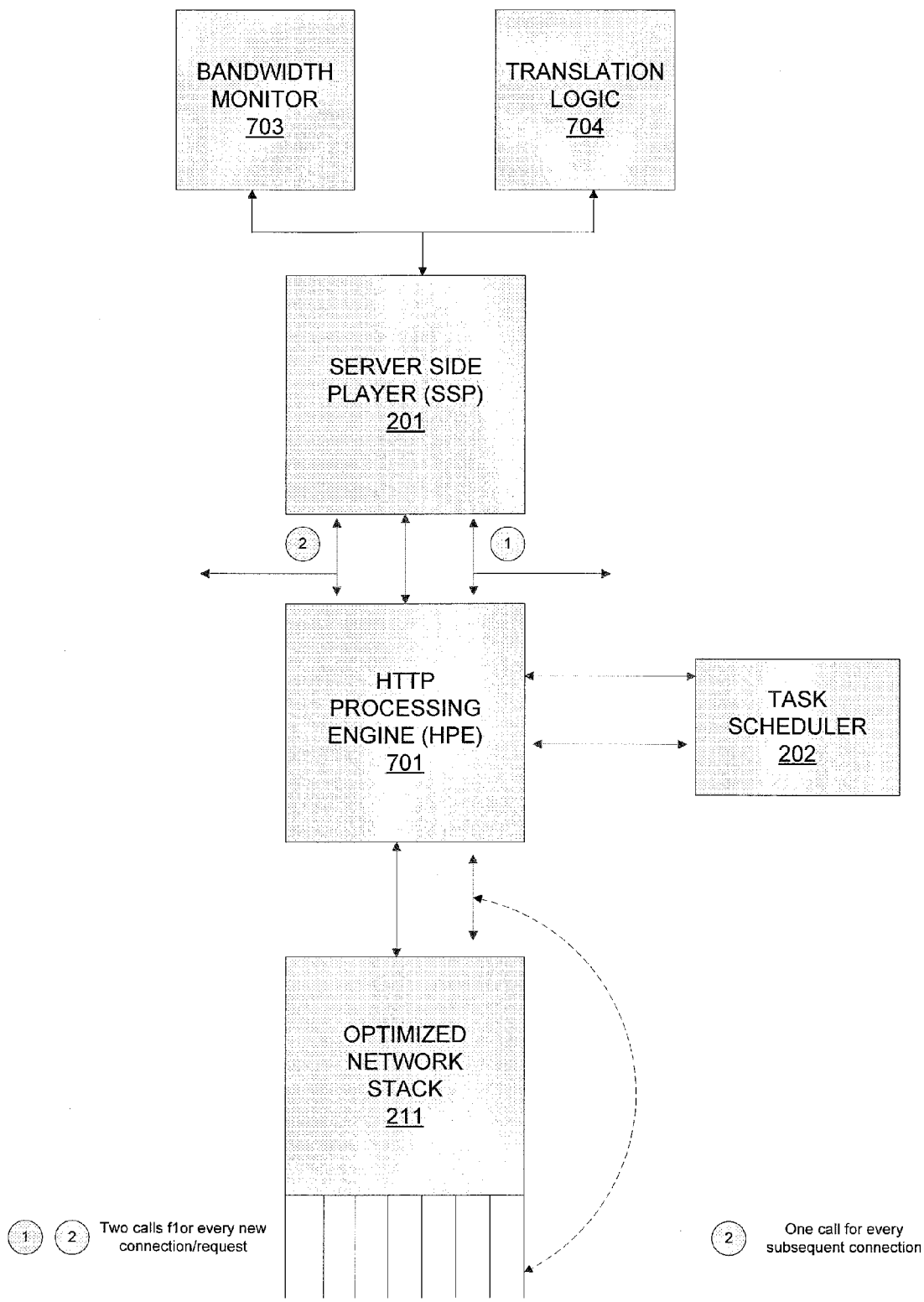
FIG. 7 illustrates flow diagram of the workflow between the HPE and the server side player, according to a possible embodiment of the invention.

FIG. 7 shows a possible embodiment of the workflow between the HPE and the server side player 201. The following steps are performed:

Step 1: User request comes to the HPE 701 through the optimized network stack 211 after a connection has been established.

Step 2: HPE 701 does minimal parsing to get the query string and name/value pairs.

Step 3: HPE 701 then initiates a call to the server side player 201 with the query string.

Step 3a: Server side player 201 may act as a pass through for files that are not related to video, but per se security access files, etc such as those requested by client players.

Step 4: For every first call per new connection, server side player 201 remaps the query string to an internal URL pointing to a metafile. This metafile stores the number of profiles present, their rates, time period, and other information of the video.

Step 5: Server side player 201 returns the remapped URL to HPE 701 and also sets a flag that indicates to HPE 701 to not send the returned metafile on the wire, but back to the server side player 201 for further processing.

Step 6: HPE 701 creates a task to fetch the metafile from cache. HPE 701 receives the metafile and passes it back to server side player 201.

Step 6a: The server side player 201 stores the information in the metafile in the socket structure for that connection. The metafile information is stored in the cache as a result of this fetch for fast lookup in the future.

Step 7: Once the socket structure is populated, server side player 201 can now remap the original URL with the translation logic plugin 704. The translation logic plugin 704 (does both seek and rate adaptation) uses the information present in the server side player 201 structure in the socket connection to do the necessary translation to different profiles/chunks.

Step 8: Server side player 201 returns the remapped URL and resets the flag in HPE 701 to convey that it is ok to fetch and send the data retrieved from the cache on the wire.

Step 9: The query string is passed to the server side player 201. Server side player 201 checks if the socket structure is already populated.

Step 10: If populated and if the name/value pair for time offset is not minimal (time offsets or byte offsets that denote a scrub or seek are present), then server side player 201 calls translation logic to remap to an appropriate URL and server side player 201 calls HPE 701 to fetch/pass data.

Step 11: If name/value pair in query string is minimal (no time offsets or byte offsets that denote a scrub or seek), then repeat from Step 4.

Scheduler 202

The scheduler 202 uses deadlines set by callers to organize scheduling of tasks. There can be hundreds of thousands of tasks in that the scheduler 202 is managing. It keeps the tasks organized by the deadlines. The scheduler 202 monitors the tasks to see if any tasks have missed their deadline. This tells the scheduler 202 that the MFD has fallen behind. It sends feedback to the server side player 201 to tell it that the delivery rate has fallen behind. The scheduler 202 can send information such as task ID and amount of time that the task missed the deadline.

In a possible embodiment, the scheduler 202 may refuse to accept a task for a new connection if it determines that it cannot meet the requested task's deadline. This is one component of admission control that ensures that MFD resources are not over-committed and existing connections play smoothly. Similarly, all components that implement tasks (e.g. buffer manager, disk manager and origin manager) can look at their internal resource commitments and fail the first task of a new connection as a way of refusing to accept the session.

The server side player 201 can identify which tasks are associated with each client. It can calculate, possibly using the above described calculations, how late it is in delivering video content to a client and adjust deadlines for subsequent tasks accordingly. The server side player 201 can then stop accepting new connections. In a possible embodiment, the server side player 201 can, possibly based on policy settings, lower the bit rate of some of the existing connections in order to accept additional connections. These approaches allow the server side player 201 to dynamically measure its performance and thus it does not need to set a static cap on the number of client connections. Given that it is handling many different bit rates, a static cap on the number of connections does not represent the actual capacity of the MFD, so a dynamic cap can be more efficient and allows the MFD to decide on its own whether it can handle more or less connections.

A possible embodiment performs deadline scheduling where each task state can have multiple deadline queues. Each deadline queue can correspond to fixed time periods, for example, 1/10 ms chunks. The scheduler 202 can pop the queue that has the shortest deadline.

Task handlers are pre-registered with the scheduler 202 at init time. They are always non-blocking. Blocking handlers are another set of threads and are described below. In a possible embodiment, any task switching does not involve a thread context switch.

Blocking tasks are given off to a pool of threads. Whenever there is a task to be completed, one thread from the thread pool services the task. The scheduler 202 at this point has handed off the blocking task. Hence, no other tasks will be blocked.

The scheduler checks relevant queues (state/deadline queues) in a WRR (Weighted Round Robin) fashion. It dispatches tasks by calling pre-registered task handlers. The scheduler 202 schedules according to a deadline by keeping track of elapsed time and popping relevant queues. The deadline scheduling is not strictly real time. The deadlines are a recommendation to the scheduler 202 that a particular task needs to be scheduled before another.

The scheduler 202 enables different types of threads. Threads are task threads, I/O threads, event threads, and network threads. These enumerated threads do not limit the number and types of threads that can be implemented. Task threads are the primary engines for task execution. The scheduler 202 is the start routine. It implements a dispatch look based on priority management. These threads block when there are no tasks to run.

I/O threads are used to implement blocking threads (e.g., disk I/O in the disk manager 206). They can block on read/write calls. Event threads are asynchronous and map network events to task state changes. Network threads implement the user space network stack and typically do not block on reads. Dedicated threads are used for scaling and management of timers for AFR. Alternatively, the network activity could be performed using tasks on the scheduler threads.

Disk Manager 206

Figure 8A:
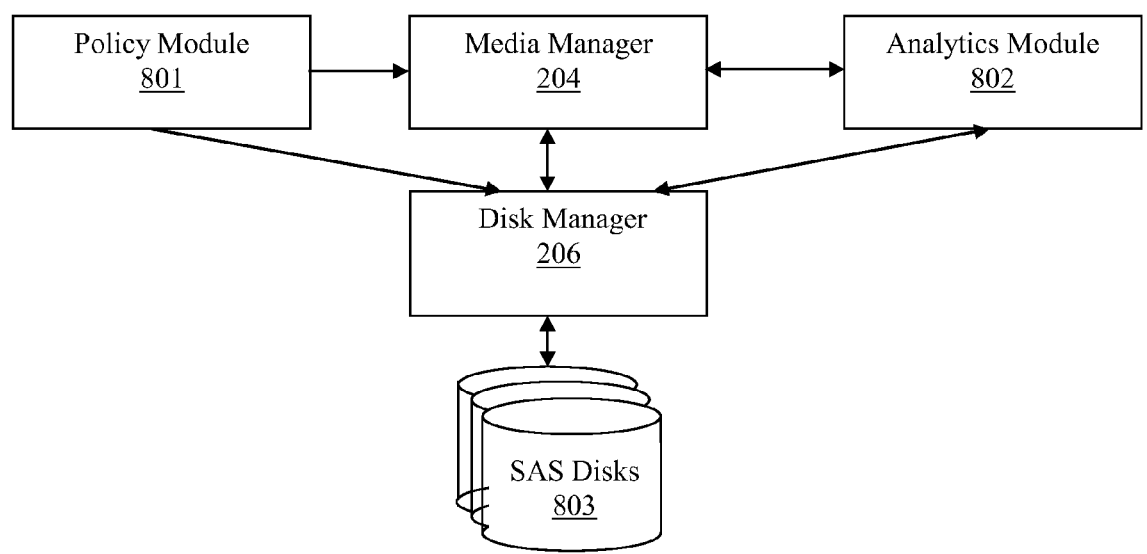
FIG. 8*a* illustrates the interaction between a disk manager and a policy module and an analytics module, according to a possible embodiment of the invention.

The disk manager 206 manages objects spread over multiple disk drives, regardless of size and count and type. Also referring to FIG. 8*a*, disk manager 206 obtains hints about object placement from the policy modules 801 (PM) and analytics module 802 (AM). The media manager 204 can interact with the PM 801 to help it decide how to apportion videos into segments and also to determine when a portion of a video is determined as hot (discussed below). The media manager 204 can also interact with the AM 802. The AM 802 determines which video portions are hot based on the statistical information covering video portion hits provided by the media manager 204.

Objects stored within disk manager 206 are most likely video related but can be anything. The disk layout of objects is particularly suited for video objects because they are consumed in a serial fashion. For small objects, disk manager 206 performs special packing so many sequential, small objects can be packed closely together in time sequence order. This works very well in the case where the small objects are chunked pieces of a larger video in time sequence. This packing allows disk manager 206 to optimize read performance of disk drives because the time it takes to read a small amount of data is about the same as the time it takes to read about 1-2 MB of data. In another embodiment, the disk manager 206 can allow for multiple strategies for packing objects. In addition to time based locality, it can also support packing based on locality within the name structure or other custom schemes.

Figure 8B:
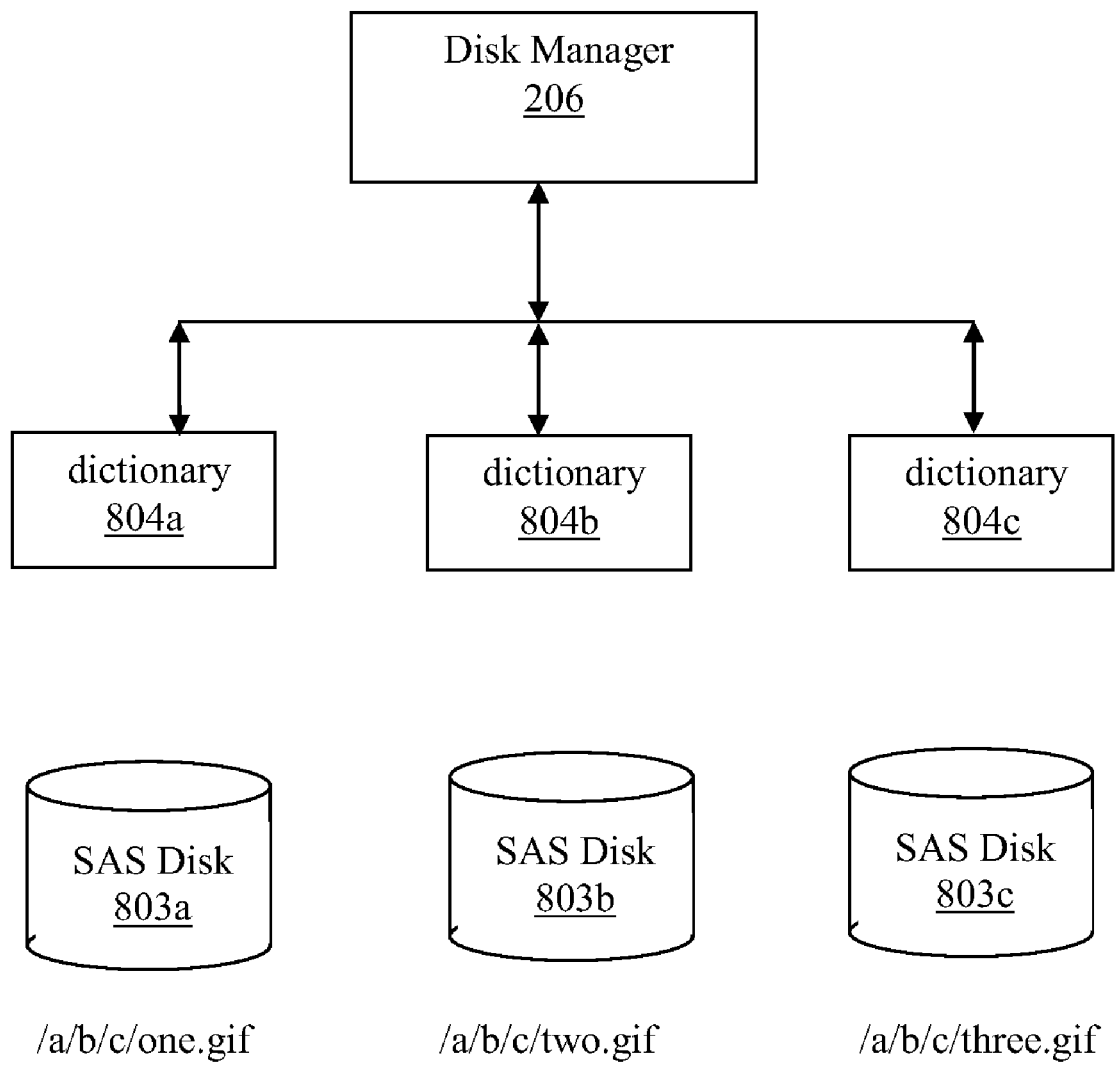
FIG. 8*b* illustrates the interaction between a disk manager and dictionaries for storage devices, according to a possible embodiment of the invention.
Figure 8C:
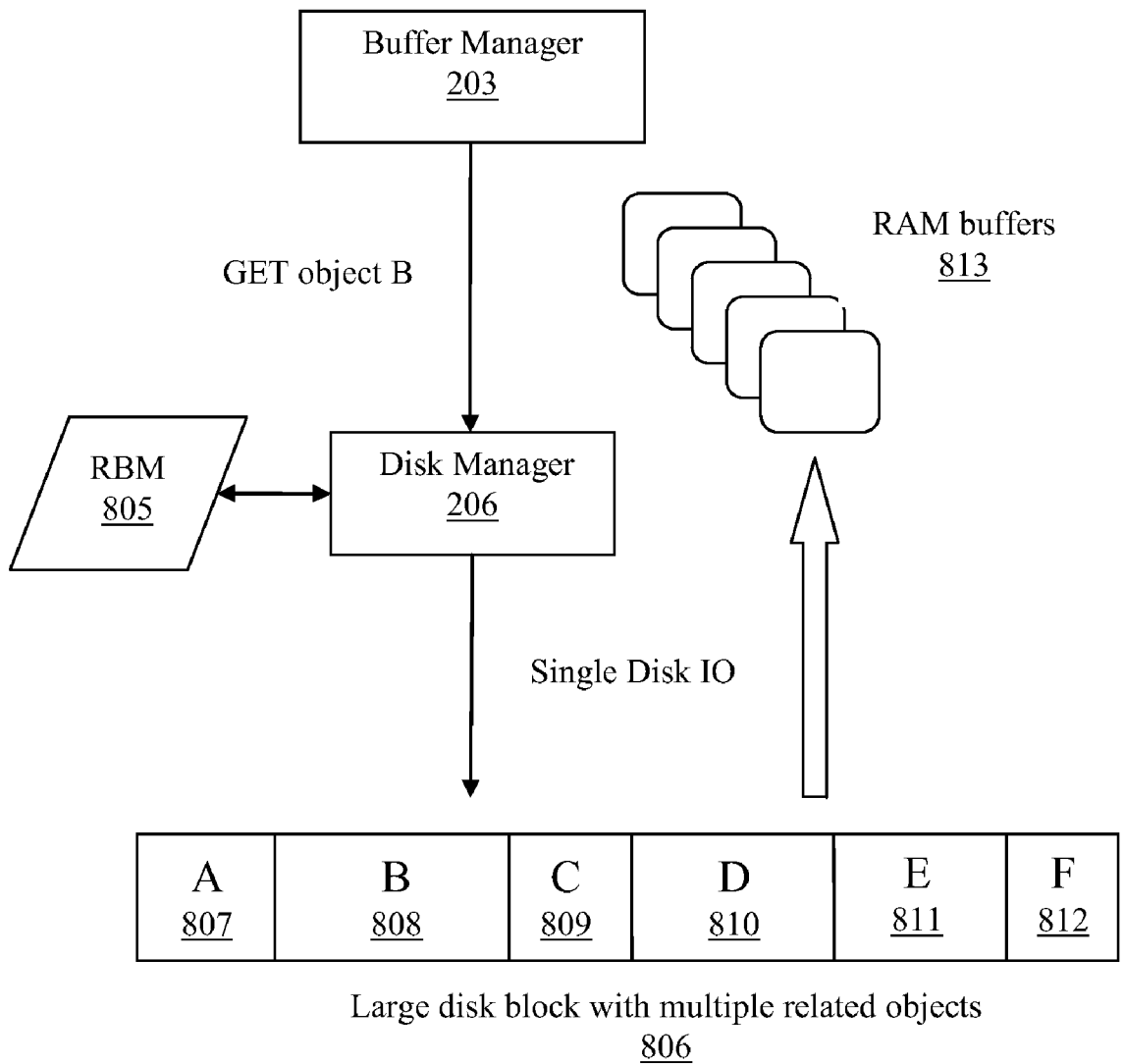
FIG. 8*c* illustrates the interaction between a disk manager and a reverse block map, according to a possible embodiment of the invention.

Referring also to FIG. 8*c*, the disk manager 206 can use a reverse block map (RBM) 805 in order to consistently read large blocks 806 (even in the presence of small objects). The block sizes are set to a specific size that allows for efficient reads from the disk drives, e.g., 1 MB, 2 MB, etc. For each block, the disk manager 206 keeps a list of extents in the RBM 805, where each extent is a contiguous portion of an object. In this example, the RBM 805 lists block 806 with related extents 807-812. Note that for smaller objects, multiple small objects themselves or portions of the smaller objects may fit into a block and may be read into cache memory together. When the disk manager 206 receives a request for a specific portion of the object, it locates the block where the specific portion resides. It then reads the entire block into cache memory 813 supplied by the buffer manager 203. Using the RBM 805, the disk manager 206 is able to assign the correct identity (UOL) to each buffer (as described below). This allows the buffer manager 203 to subsequently consume the additional data without doing any additional 10. In an embodiment, the disk manager 206 creates entries in the RBM for all of the objects stored in the MDF. The disk manager 206 may create an entry in the RBM for an object when the object is loaded from an origin server.

The disk manager 206 accounts for many types of disk controllers and disk drives, including SATA, SAS, SSD and flash. Each drive type has different size and performance characteristics. As such, the disk manager 206 will vary the data layout for each drive type to allow optimal performance and utilization of disk space. In order to self-tune for variances in drive types and controllers, the disk manager 206 performs a brief bandwidth test on startup, so it can categorize the large number of configurations that it sees within an open hardware framework.

An administrator can configure the disk manager 206 to store content from an origin server onto the hard drive or in a cache. The administrator can specify that the disk manager 206 store the content on the first hit or any specific number of hits before the disk manager 206 stores the content on the hard drive or cache. This allows the administrator the flexibility to adjust the cached content to any known or predicted demands. Alternatively, how the disk manager 206 stores the content can be driven by internal analytics. The administrator can instruct the disk manager 206 to store specific new content on the hard drive because, for example, he knows that new episodes of a show will be in demand.

Eviction policies are enforced by the disk manager 206. Content can be removed from the hard drive or cache in order to make room for new content based on eviction policies defined by an administrator or customer. In a possible embodiment, eviction policies can be internally derived based on analytical algorithms, e.g., using a least recently used (LRU) algorithm or its derivatives. The customer can install enough storage capacity in the MFD such that the storage space may never be filled by the customer's content. The customer may desire to have its content in the fastest areas of the hard drives and sparsely populate the hard drives in order to accomplish this goal. The customer can then have a set of MFDs dedicated to their hottest content with sparsely populated hard drives and have another set of MFDs caching their less-popular content. The administrator can specify that certain hard drives on a MFD are kept sparsely populated with the hottest content and other hard drives on the MFD are used for all other content. This allows a customer to implement an efficient storage scheme for a particular MFD.

Referring also to FIG. 8b, the disk manager 206 treats each device as an independent cache module. The meta-data and data on each device comprise a separate and independent store, similar to a filesystem. However, the naming hierarchy is common across all modules, unlike a traditional filesystem, where a given name is bound to a logical device (filesystem). For example, if a traditional filesystem were mounted at /a/b/c, then all objects under that directory would be located in that filesystem. By contrast, the disk manager 206 is able to store /a/b/c/one.gif, /a/b/c/two.gif, and /a/b/c/three.gif in any of the cache devices 803a, 803b, 803c, it manages. During initial placement (as well as relocation for load balancing), the disk manager 206 selects the device to store the object based on usage statistics it keeps on a per device basis. During lookup (to serve the STAT task), the disk manager 206 determines which devices have the object and selects one, again based on usage statistics. This allows objects, or portions thereof, to be placed and served from any cache module independent of its name. The disk manager 206 is able to optimize the bandwidth from each device by placing objects (and relocating them dynamically) based on usage statistics. In an embodiment, the disk manager 206 keeps track of per device traffic in terms of read and write throughput for each device. During initial placement and relocation, it chooses the device with the least amount of traffic. In another embodiment, it uses the queue depth (number of outstanding requests) and average latency as the measure of traffic. The flexible placement results in linear scaling across cache devices.

In an embodiment, the disk manager 206 caches the dictionary 804a, 804b, 804c, for each cache device 803a, 803b, 803c, in RAM. The dictionary 804a, 804b, 804c, consists of the tree of objects stored in that device 803a, 803b, 803c, along with a small amount of metadata about the object. This allows the disk manager 206 to answer the STAT query very efficiently and without incurring any disk IO.

The disk manager 206 provides a simple fault recovery model. The failure of a single cache device just results in the loss of the objects contained in that cache device. It has no impact on the performance of the other cache devices. The failed cache device can be replaced (online, for a hardware system that supports hot swapping) and reconfigured as a new cache module. In an embodiment, the disk manager 206 can also selectively replicate objects in multiple cache devices in order to get better fault recovery and performance.

In an embodiment, all information about videos is self-contained within each drive such that drives can be moved between MFDs. Over time, disk manager 206 queries the analytics module 802 to atomically move entire movies or clips between drives and/or to inner or outer tracks in drives in the SAS disks 803. Disk manager 206 provides data necessary for the media manager 204 to promote and demote objects between various layers within the cache hierarchy. Initial placement of content can be dependent on data from the analytics module 802 and/or the policy module 801. The disk manager 206 chooses the data layout that optimizes read performance, even for small objects.

The disk manager 206 can avoid fragmentation problems that affect performance for most filesystems. It does so by reclaiming entire blocks whenever a configurable amount of space has been freed in that block. For example, if a 2 MB block is filled with 64 objects of 32 KB each and half the objects are deleted, e.g., based on eviction, the disk manager 206 can free the entire block. The RBM is used by the disk manager 206 to logically delete or relocate the remaining objects.

Video information can include: compressed/uncompressed video data, video attributes needed by an application (header information), and video attributes needed to aid internal operation (cache expiry, cache initial time). The disk manager 206 readjusts cache contents as drives are removed and added. It also gracefully handles runtime errors from the physical media. SAS, SATA, SSD, and flash drives are supported together on the same system. The disk manager 206 allows high levels of parallelism to multiple drives. A possible embodiment allows pre-loading of the cache with media which is can be served until a specific date and/or time.

Intelligent Caching

Hard drives typically do not operate well as caches, when a hard drive is used as a cache and it is caching hundreds, thousands, or even tens of thousands of videos, the end result is a random input/output (IO) pattern. The MFD places interesting content in the same area of the hard drive so the MFD can perform large reads to compensate for bandwidth, e.g., for a low bandwidth connection, the MFD can read 30 seconds of video in one read and store it in the cache in the RAM or SSD (or buffered on the hard drive depending on the number of connections being served and bandwidth considerations of those connections). This allows the client to be served out of that cache and the client does not need its next IO for 30 seconds. The SSD is used for content that is accessed more frequently or for content that requires smaller random IOs that cannot be efficiently served from the hard drive. A popularity index is used for portions of content to determine whether a portion is hot. For videos, people may not be watching the entire video and some portions of a video may be hotter than others, so the hottest portion of a content is cached. This allows the MFD to be more intelligent in its caching. The MFD does not have to cache an entire video stream, for example. The MFD dynamically computes the popularity of portions of content.

Figure 3:
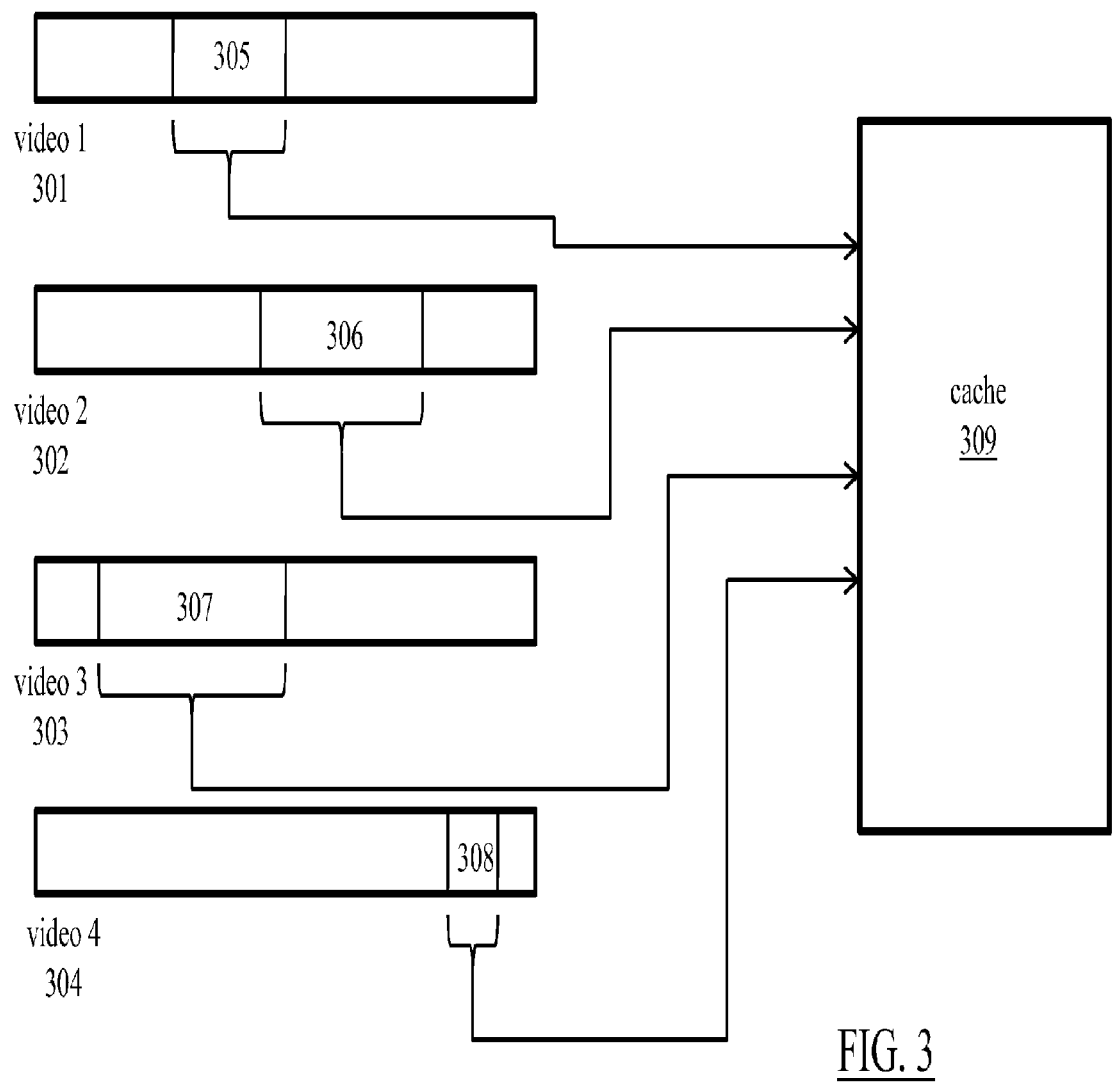
FIG. 3 illustrates an example of dynamically determining the popularity of portions of content, according to a possible embodiment of the invention.

Referring to FIG. 3, the boundaries of the hot portions of video are determined dynamically as the MFD measures accesses of a video stream. In a possible embodiment, the server side player 201 uses a logical chunking approach to dynamically determine where the hot portion of the video is. For example, the server side player 201 may use frame identifiers such as time tags embedded in the video frames or storage memory address locations. The frame identifiers may be obtained by the server side player 201 using a table of offsets created for the video stream. The table of offsets may be created by the system upon receipt of the video stream or created by a content provider which is loaded into the system at the time the video stream is received. Multiple tables may be stored for different bit rates of the video stream.

The server side player 201 can determine the portion or boundaries of the video stream that covers the most viewed frames of the video stream and places the hot portion of the video stream into one of the caches (hard drive, SSD, or RAM). In a possible embodiment, the analytics module monitors video 1 301, video 2, 302, video 3, 303, and video 4 404. It finds that there are sections of the videos that are viewed more frequently than other parts of the videos or other videos by client systems. Those portions of the videos 305, 306, 307, 308, are stored in the cache 309. The cache 309 may be any of the caches, RAM cache, SSD cache, or hard drive cache, or any combination thereof.

In a possible embodiment, the server side player 201 supports physical chunking of a stored video stream that partitions the video stream into small files and determines which file is popular. Physical chunking splits the video into small named chunks that are visible to the client player.

Time-based access patterns are used to determine which videos tend to be watched together, e.g., subject-related news items or content-related videos, and the disk manager 206 co-locates the hot portions of the videos in the same area in the hard drive cache, SSD cache or RAM cache, thereby increasing cache hits and allowing for faster access times.

The RAM cache is integrated with the buffer manager 203. It uses analytics and/or policies to manage the RAM cache and select eviction candidates. As the server side player 201 finds each hot video portion, the buffer manager 203 determines which hot portions already stored in the cache are no longer determined to be hot. The buffer manager 203 removes portions that are no longer hot from the caches in order to make room for new hot portions. This is done by the buffer manager 203 based on internal analytics derived from access patterns. In an embodiment, the buffer manager 203 keeps all buffers that are not in active use organized by eviction order. The ordering takes into account factors like the number of times the buffer was accessed, the time frequency of accesses, and the increasing/decreasing rate of use.

The buffer manager 203 can use main memory (RAM) as a cache for high-bit rate videos and SSD memory for low-bit rate videos. This allows the MFD to more efficiently use the main memory.

The media manager 204 manages the cache hierarchy (e.g., SSD, hard disk, peer). It looks at analytics and/or policies to determine when to promote, demote, or evict cache contents. The media manager 204 initiates the hierarchical cache management which includes cache promotion and demotion actions. The implementation for each element in the cache hierarchy is called a cache provider. Providers are dynamically registered and assembled into a hierarchy based on the properties that they register, e.g., bandwidth, latency, capacity, etc. There are two classes of providers: cache providers that are local caches to the system that support reads and writes; and origin providers that are networked sources that supply origin content and are read-only. The units of cache migration can incorporate the logical chunk boundaries or in some cases be purely derived from device level block management. For example, in the HDD, popular blocks (that may contain portions of multiple videos) can be promoted to SSD or to the outer tracks of the HDD.

Metadata describes where media is stored among the disks. Most operating systems cache information about files. The information is called an inode. An inode cache can hold many inodes, typically on the order of millions. This cache will consume precious memory which the MFD could use to cache media data. The MFD has information to tell it where various pieces of media data are stored within the raw partition of a disk. This information falls under metadata and is called an "extent". Each disk block which holds a large media object can have a single extent to refer to that data. When a disk block holds multiple small objects, each small object has a separate extent to describe it.

In order to reduce the inode cache space which is hard to control in some systems, the metadata is packed, including extents, into single inodes/files called containers. Each container holds the extents for a set of objects that are common. Because the objects are common the MFD would have normally read the metadata for these objects.

In a possible embodiment, the MFD creates a dynamic disk hierarchy that allows the MFD to determine the bandwidth of the disks within the MFD. The disk manager 206 determines which drives are possible cache targets. It runs a short test to categorize each drive according to disk bandwidth. This is done because the same type of drive can see different performance numbers depending on which disk controller is in front of it. By running a disk test, the disk manager 206 does not need to distinguish between various drive types or figure out what performance each disk controller can deliver. The drive/controller bandwidth combination will place the pair within some category set by the factory or by an administrator. There typically are a preset number of categories.

In a possible embodiment, the MFD creates a disk cache hierarchy. Each level of the cache hierarchy contains a set of objects. Objects near the top in terms of number of accesses are good candidates to move into the next fastest hierarchy, thereby enabling a decrease in total access time for all objects. Movement of an object from a lower level to a higher level can be determined using the bandwidth usage and the space usage to determine when it is appropriate to move the object. Objects near the bottom in terms of number of accesses are good candidates to move into the next slowest hierarchy, freeing up room for higher access count objects. The MFD attempts to maximize the available bandwidth for the highest level to the lowest level. For example, three levels, A, B, and C, are defined, with A being the fastest cache. If A is not full, then it would make sense to promote the highest accessed objects in B to A. This would leave more room to promote objects from C to B. If some objects in B are accessed less frequently than objects in C, then it would make sense to demote the least accessed objects in B by moving them from B into C and the promote the most accessed objects of C into B. This movement process is called "promotion" and "demotion".

The outer 10-15% of each disk drive can deliver 15-20% better performance than the random performance of an entire drive. A possible embodiment can carve out the outer part of a drive and migrate the hottest parts of media objects to this area.

Buffer Manager 203

The buffer manager 203 provides the primary data path within the MFD. All content served by the MFD are sent via buffers. Buffers are used both for speed matching (buffering) between the outbound network and the cache providers as well as a RAM cache. The latter is the (implicit) first level in the cache hierarchy. When requested content is not available in the cache, the buffer manager 203 uses the services of the media manager 204 to retrieve that data and cache it for subsequent requests if possible.

The buffer manager 203 receives a request for content from a task that the HPE creates. The buffer manager 203 fetches content. Given a URL and an offset to play from, it will supply the content. The buffer manager 203 retrieves the content from media manager 204. The buffer manager 204 creates a task to retrieve a portion of the video content starting at the offset. The media manger 204 retrieves the content form the hard drive or SSD. The buffer manager 203 can check if the requested content matches any content stored in the main memory cache (RAM). The RAM cache is composed of a plurality of buffers. A hit can be directly served from the cache without any further copying. A miss is served by filling a new buffer using the media manager 204 to locate the content in storage. The buffer manager 203 passes a pointer to the buffer containing the portion of video content to the output protocol engine 210 which streams the portion of video content to a client.

The buffer manager 203 efficiently manages a large amount of memory. It has the ability to share buffers across connections that are serving the same content. The buffer manager 203 also has an efficient re-use scheme derived from the usage pattern in the MFD.

The buffer manager 203 handles buffer eviction based on a cost function that is calculated based on the use count and age. A higher use count results in a higher cost, whereas the age acts as a decay function on the cost, e.g., older buffers have a lower cost. The eviction algorithm attempts to approximate finding the lowest cost buffer while operating very efficiently (constant time).

A buffer that can be evicted (has a zero reference count) is inserted at the tail of an LRU list. The lists are ordered by the use count of the buffers. Each LRU list is effectively ordered by timestamp. A buffer that is not in the cache (e.g. expired, purged) is put on the head of the lowest LRU list with a zero timestamp.

During the eviction, the cost is computed for the head of each LRU list and the lowest cost buffer is evicted.

Each object (URI) has an expiry time that is part of the attributes. On access in the buffer cache, the expiry time is checked against the current time. If expired, all the buffers and the attributes associated with the object are removed from the cache. The buffers are put on the LRU lists when the reference count becomes zero. An object can be revalidated with the origin server during a time window (that can be configured by the administrator or user) prior to the expiry time.

Figure 9:
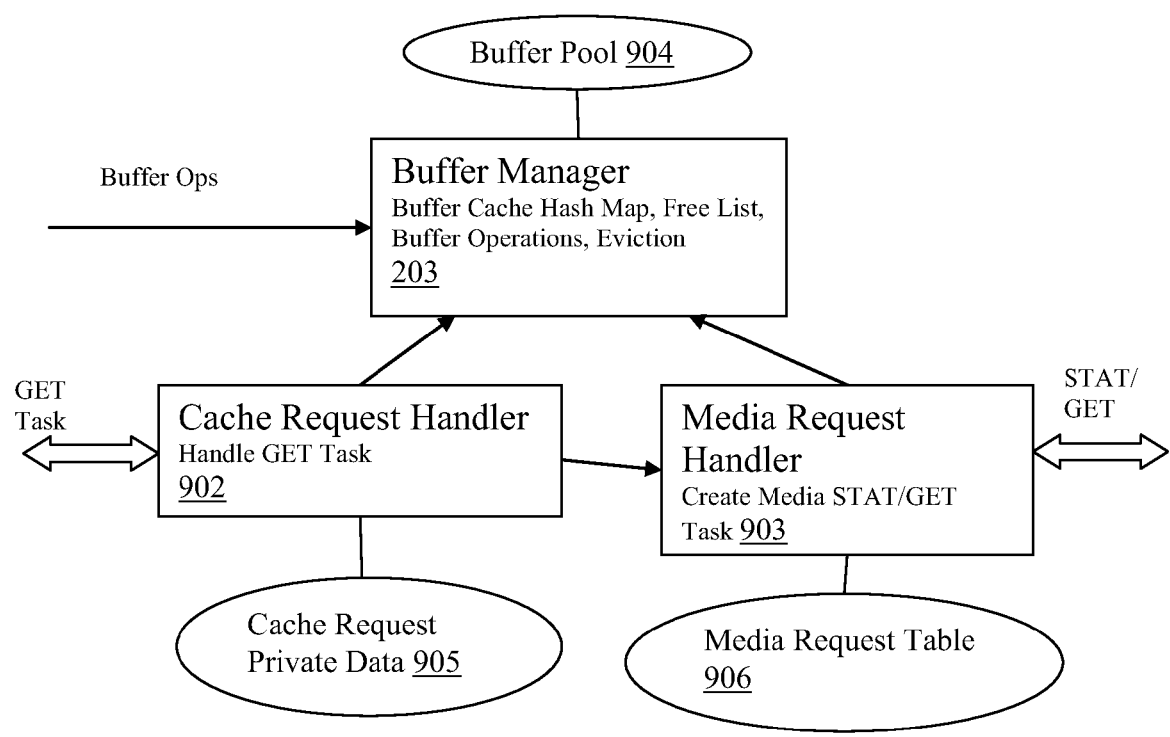
FIG. 9 illustrates the interaction between a buffer pool and buffer manager, according to a possible embodiment of the invention.

Referring to FIG. 9, in a possible embodiment, the buffer manager 203 manages the buffer pool 904. The memory available for data is statically divided into an array of fixed size pages. Each page has a corresponding buffer structure to encapsulate the metadata associated with a buffer. The buffer structures are also statically allocated from an array. Each buffer can be linked via the buffer cache and the free list. Some of the elements of the metadata are:

Identity. The identity of the buffer. Data buffers have an ID consisting of the UOL (URI, Offset and Length). Attribute buffers have an ID of URI only.
Reference Count. The number of active users of the buffer.
Use Count. The number of times the buffer has been used. This is the basic measure of the buffers "popularity".
Timestamp. The time at which the buffer is put on the LRU list (i.e. reference count is zero).

The buffer manager 203 manages the buffer cache. A hash map using the UOL as the key is maintained for all buffers that have an identity and can be shared with other connections. A possible embodiment supports a non-cached mode for a buffer whereby it has an identity, but is not shareable.

Data buffers associated with the same object (URI) are linked together with a list rooted in the corresponding attribute buffer. This allows fast application of actions that pertain to the entire object (e.g., cache expiry and object purge).

A free list is also maintained by the buffer manager 203. All buffers, including those with an identity, that have a zero reference count are on this list. This allows for efficient eviction of buffers as needed. The list can be composed of multiple lists ordered by the use count of the buffers.

Each GET task allocates some private data in the cache request private data 905 that is used to keep a list of its buffers for reference counting. It is also used to link to an underlying media request. The cache request handler 902 manages the cache request private data 905 and handles the GET task requests.

The media request handler 903 captures the in/out arguments for each media GET task sent to the media manager 204. Media Request objects are linked into a media request table 906 so that multiple requests to the same, or co-stored, objects can be synchronized.

Figure 10A:
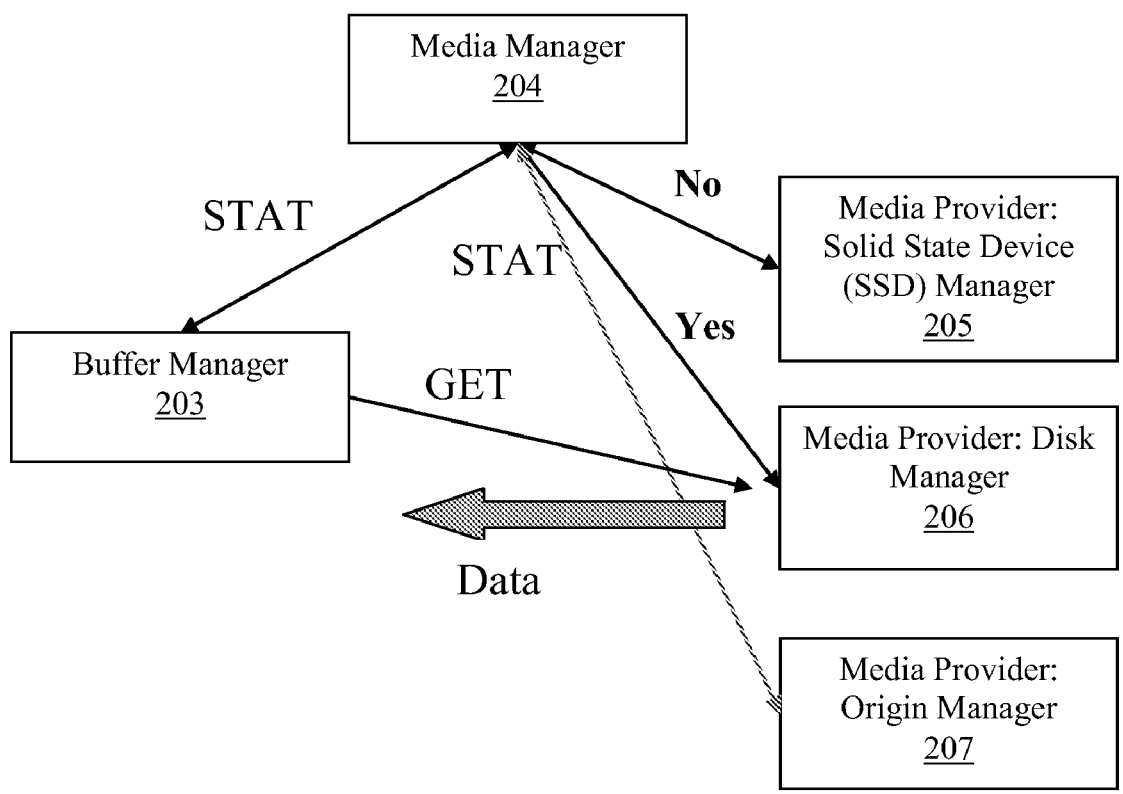
FIG. 10*a* illustrates the interaction between a media manager, buffer manager, and media providers, according to a possible embodiment of the invention.

Referring to FIG. 10a, the interface between buffer manager 203 and the media manager 204 (which implements the cache hierarchy) has unique characteristics that enable the high performance caching system. The selection of the device that provides the data is done using a STAT task that acts like a bidding system. Each layer in the cache hierarchy, e.g., solid state device (SSD) manager 205, disk manager 206, and origin manager 207, can respond, in turn, to bid for serving the request. The bid includes a "blocksize" that tells buffer manager 203 to allocate the requisite set of buffers. The buffer manager 203 then sends down a GET request to the specific cache provider that won the bid. The request and response are logically decoupled. The provider fills the supplied buffers with content and sets the appropriate identity for each buffer. This results in the new buffers being inserted into the RAM cache. Upon completion of the task, buffer manager 203 looks up the RAM cache again and is able to find the buffers it was looking for. This model allows the providers to supply additional data, either subsequent portions of the same object or other related objects, in the same request. It also allows various portions of an object to be supplied by different providers. Naming and location are orthogonal. For example, a video object with a name /a/b/c/one.flv can exist (in parts or whole) in any of providers in the cache hierarchy.

Media Manager 204

The media manager 204 promotes and demotes videos based on the relative hotness of the video. The hotness of the video is a function of the number of hits on that video, the frequency of hits, and the increasing or decreasing trend of the frequency.

The media manager 204 has n different sources, the SSD(s) 205, hard disk(s) 206, origin server 207, or peer 208. It receives a buffer and fills it with a portion of the requested content. The media manager 204 sends the filled buffer to the buffer manager 203. If the content is not in local storage the media manager 204 retrieves the content from the origin server, a peer, or a client. The following is the hierarchy of speeds, in a possible embodiment, associated with each source:

1. Memory (RAM): 10 Gbps
2. Flash: 4 Gbps
3. Solid State Device (SSD): 1.6 Gbps
4. Disk (SAS): 550 Mbps
5. Disk (SATA)—400 Mbps
6. Others
7. NFS and other file caches.
8. Origin Manager.

Figure 10B:
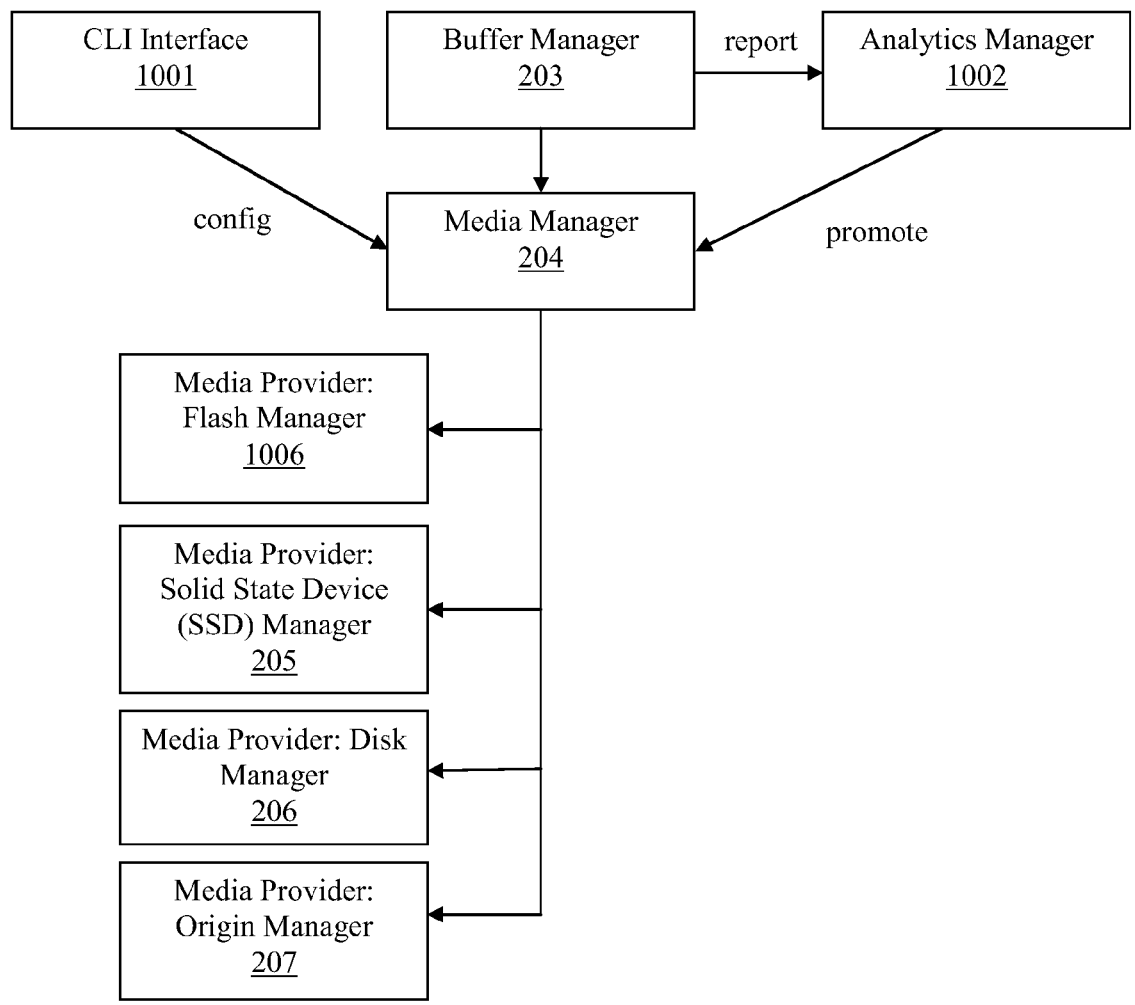
FIG. 10*b* illustrates the interaction between a media manager and analytics module for determining hot video segments, according to a possible embodiment of the invention.

Referring to FIG. 10b, the media manager 204 first places a new video in the lowest memory hierarchy. On a timer expiry, the media manager 204 checks the analytics/policies manager 1002 for the hottest and the coldest video. The analytics/policies manager 1002 provides the media manager 204 with the hottest videos and/or portions of videos accessed. The hottest video or portion of video is promoted to the next memory cache in the hierarchy and the coldest one is demoted to the next lowest in the hierarchy. In this way, a video can be placed in the lowest tier of a cache hierarchy and can bubble to the top of the hierarchy if its hotness increases relative to other videos.

The media manager 204 drives the eviction of videos from the respective caches. It implements an eviction timer. When the timer fires, the media manager 204 goes through each cache provider 205, 206, 207, 1006, checking whether the cache is full to a certain threshold. If a particular cache is full, the media manager 204 calls the eviction functionality of the provider. The provider then performs its specific algorithms for eviction.

Peer Manager 207

The peer manager 207 can be configured to obtain certain content from a peer MFD upon a cache miss. Given that a MFD has a limited amount of storage space in local storage such as one or more hard drives and one or more SSDs, a scenario may exist where a customer has more video content than a single MFD can store. The customer's video content can be distributed among a plurality of peer MFDs installed at the customer's site or, where the peer MFDs are accessible to each other over a network such as an intranet, Internet, LAN, or WAN, distributed among the plurality of peer MFDs that are in communication with each other.

An administrator can inform each peer MFD of the IP addresses of its peers so a peer MFD is able to communicate with its peers. If the peer MFDs are locally attached, they can discover their peers by themselves through any type of discovery mechanism. The peer MFDs can communicate among themselves and let each peer MFD know what URLs it caches. This means that after each peer MFD has loaded content from an origin server or another peer MFD, it informs each of its peer MFDs about the URLs that it serves. This can be via a message or series of messages sent to each peer MFD or broadcasted to all peer MFDs. If a request for a specific URL is sent to a peer MFD that causes a cache miss, the peer mgr in that MFD can request the URL content from a peer MFD that caches that specific URL.

Origin Manager 208 a. The origin server may push content to the origin manager 208 or the origin manager 208 may pull content from the origin server. The origin server may push content to the origin manager 208 by pre-staging the content to the origin manager 208. The origin server can FTP or HTTP into the origin manager 208 and tell the origin manager 208 to cache certain URLs because the content provider knows that the content will be hot.

b. The origin manager 208 pulls content from the origin server as a result of a client request that misses all locally available caches (also a proxy function). Pulling content can also occur due to a policy or command driven action to fetch content separately from a client request. The proxy function is separate from the cache ingestion. There are several reasons for this: (a) the proxy may have to serve oddly aligned byte range requests that are not convenient for caching; (b) the system may need to perform processing functions like chunking and transcoding during ingest (these are difficult to do in real time in the proxy); and (c) different policies for the two functions.

Input Protocol Engine 209

The input protocol engine 209 operates in the same manner as the output protocol engine 210, except that it communicates with origin servers using protocols such as HTTP, FTP or NFS.

Optimized Network Stack 211

The optimized network stack 211 uses the round trip time (RTT) in the TCP stack to estimate the last mile bit rate variation to the client. The RTT time tells the optimized network stack 211 if there is congestion down the line. The RTT provides an estimate of bandwidth available in the network going to the client. The optimized network stack 211 also implements error handling and congestion control using algorithms suitable for time sensitive applications such as video. The MFD can change the bit rate in response to the detected bit rate changes without the client knowing.

Assured Flow Rate

In a possible embodiment, the MFD has the ability to guarantee a certain class of service to every flow admitted into the system for data delivery. This is called the assured flow rate. The MFD calculates the assured flow rate for each session and sets up a maximum bandwidth for the session. The bandwidth usage for the session should be no less than the assured flow rate and should attempt to reach maximum bandwidth if there is bandwidth available.

The MFD implements flow control to ensure that existing sessions get the required rate and no more than the maximum. This is achieved in the network socket level. The socket level manages the data send rate. The session bandwidth queue and server timer are used for calculating flow control.

The MFD performs admission control and connection management by ensuring that a new session is not admitted if the server does not have enough resources to accept the connection.

Four metrics can be used for the MFD to maintain the assured flow rate (AFR):

$\Sigma$ AFR of all connections $\leq$ Appliance Interface port Bandwidth

Session AFR $\leq$ Client Session Bandwidth $\Sigma$ AFR of all connections $\leq$ (Disk+Buffer) Read speed Poorest Quality video bit rate $\leq$ Session AFR $\leq$ Highest Quality video bit rate Where:

Session: A single TCP connection.

$\Sigma$ AFR of all connections: Sum of AFR of all accepted sessions.

Session AFR: Individual AFR for one single session.

Client Session Bandwidth: The client session maximum bandwidth. Typically the client session maximum bandwidth refers to the max TCP throughput due to the limitation of the WAN environment. For a DSL download, the typical bandwidth is 1,500 Kbits/sec.

Video bit rate: Each video has a profile. Different profiles have a different quality. Higher quality videos require a higher bit rate. Not every video has a profile for all bit rates. A typical video profile bit rate could range from 200 Kbits/sec to 1,000 Kbits/sec.

To ensure that the MFD does not over commit server resources so that the AFR for existing sessions can be maintained, the MFD either rejects a new session or lowers the profile (if possible) for existing sessions to accommodate the new session based on a policy setting. A session is rejected by sending over a server busy HTTP reply or by simply closing the connection. The MFD does not close sessions in the middle of serving data. It simply lowers the video profile.

For example, if the total appliance network bandwidth is limited to 1 Gbits/sec for each network interface port, then the ΣAFR of all sessions should be less than this bandwidth. When the sum of the AFR of all of the accepted sessions is equal to 1 Gbits/sec, the MFD can stop accepting new sessions. In a possible embodiment, by considering the network overhead used by packet retransmission, ACK packet, TCP/IP header, other usages such as ARP, the off-line origin manager 208, etc., the bandwidth can be reduced to 0.8 Gbits/sec for all session AFR calculations in order to take in to account a more realistic bandwidth limitation.

The AFR bit rate can be between the poorest quality video bit rate and highest quality video bit rate. If the AFR<poorest quality video bit rate, then screen jitter will occur at the client side. If the AFR>highest quality video bit rate, then bandwidth resources are being wasted. The server side player 201 does not close a continuous session GET request but is allowed to close a new session by returning a failure error code.

In a possible embodiment, if a client is gaining access via a dial-in modem, the AFR is limited by this slow last mile connection. The network driver module detects the client connection ISP speed based on RTT calculation. An example equation can be: client session bandwidth speed=1460 bytes/RTT in seconds.

As discussed above, video content is stored in the disk or RAM. Once the MFD determines the AFR, it needs to make sure that the disk+buffer can achieve this speed. Disk speed, as a capacity, is not something that is easy to measure, unlike CPU and network capacity. It is highly workload dependent. A more practical way to measure if the disk is at or close to capacity is to look at queue depth and/or average latency. The scheduler's 202 deadline miss counter is a good indicator of what is happening in the system.

Under certain situations, for example, the Web master wants to create a VIP list. The Web master through the user interface management console may set up a policy so that the VIP list receives high quality video which results in a higher AFR for the session. In another example, the Web master can set an average video quality. The Web master can use the user interface manager console to set an average AFR.

In a possible embodiment, the MFD does not want to send a higher video quality to a client that cannot play the high quality video. For example, a PC/Laptop can play high quality videos, but an iPhone/g-phone/Palm, etc., only has very small screen and therefore cannot play a high quality video. It is completely unnecessary to send over high quality videos to these kinds of devices.

Figure 11:
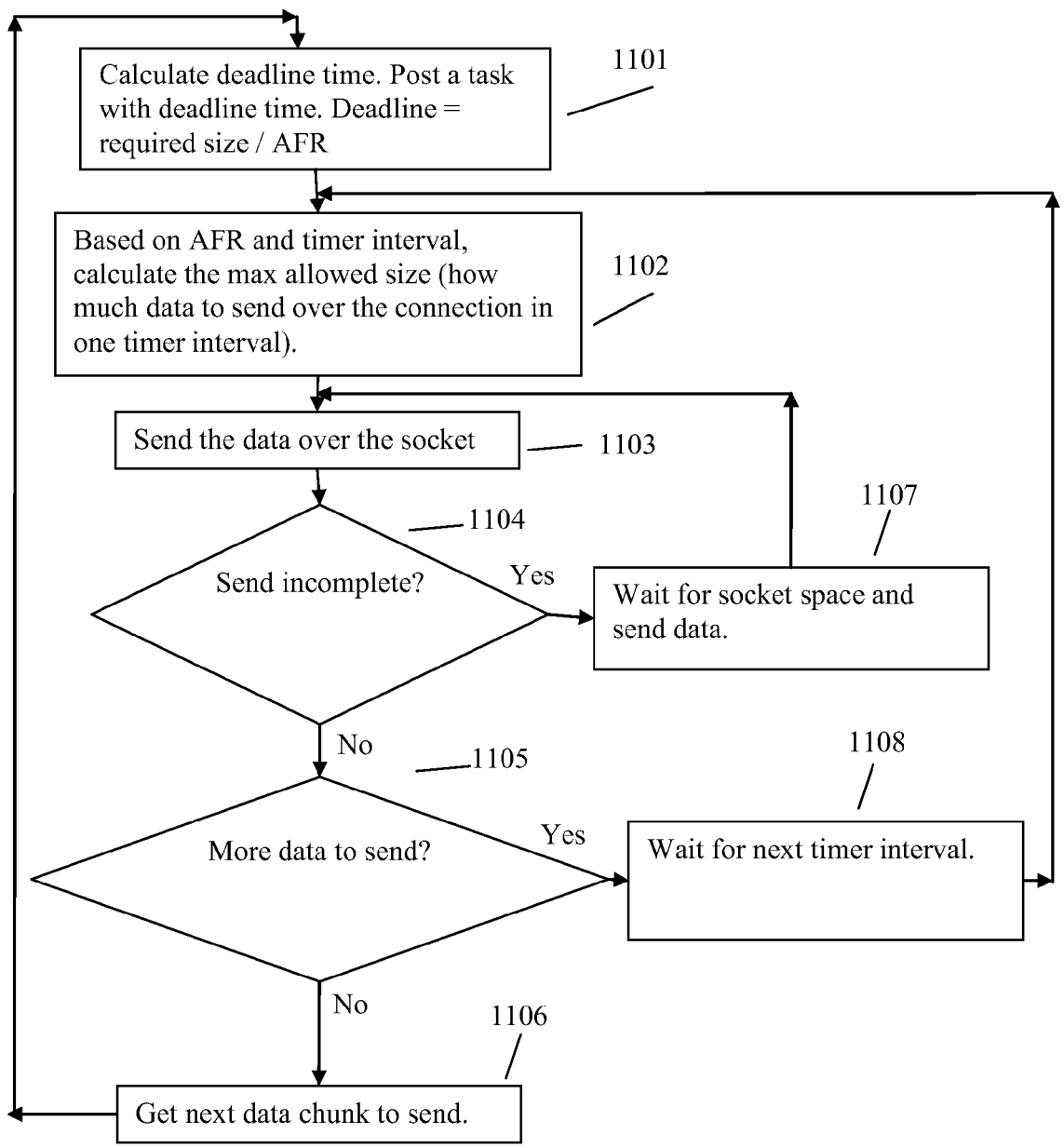
FIG. 11 illustrates a flow chart of a network manager in a MFD, according to a possible embodiment of the invention.

Referring to FIG. 11, a data flow is shown for a possible embodiment of the AFR portion of the network manager in the optimized network stack 211 sending data out after the HPE posted a task to the scheduler 202 and the scheduler 202 returned a chunk of data. If the calculated size of data cannot be sent out within one timer interval slot (e.g., once a second), it means an AFR miss occurred in the network manager. If scheduler 202 does not return a task within a deadline miss time, it means an AFR miss in the disk manager 206.

The network manager calculates the deadline time for the task. It then posts a task with the calculated deadline time 1101. The network manager then calculates the maximum number of bits that can be sent over the connection given the AFR and the timer interval for the transmission period for the socket. This results in the maximum amount of data that can be sent over the connection in one timer interval 1102. The network manager then sends the data over the socket 1103.

If the send was incomplete 1104, e.g., there was not enough space for the data to be sent or the timer interval has lapsed, then the network manager attempts to resend the data over the connection 1107, 1103.

If there was enough space for the data to be sent out/received 1104 (e.g., the buffer level on the client was sufficient, the TCP level was sufficient, the window size was sufficient, more data is to be sent, etc.), then the network manager checks to see if there is more data to send 1105. If more data is available to send, then the network manager puts the socket back into the timer queue to wait for the next timer interval to send more data 1108 and calculates the next maximum number of bits that can be sent over the connection 1102. Otherwise, the network manager is finished with the timer interval and gets the next chunk of data to send 1106.

The process continues until all data from the chunk(s) of data from the scheduler 202 has been sent.

In a possible embodiment, the MFD performs the following in order to maintain the AFR:

1. Connection requested on a network port. If this network port's total connections>max allowed connections, reject the connection.

2. Each connection can only share up to the calculated session bandwidth. In this example=1 Gbps/total connections on this network port.

3. Modification due to maximum session bandwidth configuration.
   a. If maximum configured session bandwidth is configured and the calculated session bandwidth>maximum session bandwidth, set the calculated session bandwidth to maximum configured session bandwidth.
   b. Else make no change.

4. Calculate session AFR.
   a. Set session AFR to configured AFR as base suggested AFR.
   b. Call server side player 201 for adjusting the AFR. If error message is returned by server side player 201, close session.

5. Modification due to balanced AFR calculation.
   a. If calculated session bandwidth>1.2*AFR, set the calculated session bandwidth to 1.2*AFR.
   b. Else make no change.

6. Modification due to AFR.
   a. If the calculated session bandwidth<AFR, set the calculated session bandwidth to AFR.
   b. Else make no change.

7. The calculated session bandwidth is enforced in every epollout event or task completion, on whenever data is about to be sent out to the client.

The network and HTTP manager provide three parameters to the server side player 201 for calculating the server side player 201 AFR value. The three parameters are:

URI.

Client Session Bandwidth (Ceiling value of AFR).

Total available AFR of network bandwidth.

Where:

Total available AFR may be trimmed by network module.

Total available AFR≠Total network bandwidth−ΣAFR of existing sessions.

Total available AFR=min (Total network bandwidth−ΣAFR of existing sessions, configured maximum AFR)

In the server side player 201 AFR calculation, the return AFR value can be less than client session bandwidth and total available AFR. The server side player 201 can be called at the time after the HPE finishes HTTP parsing. The HPE provides all HTTP information (such as URI, etc.) as well as a flag to show this is a new session or a continuing session with the same connection.

The server side player 201 does not close a continuing session GET request but should be allowed to close a new session. The server side player 201 sets the AFR to the value specified in the URI request. If the server side player 201 is unable to set the AFR to the requested value, it returns an error code to the HTTP Engine that will close the connection.

The scheduler 202 deadline misses can be used to measure disk throughput during runtime. The HPE calculates the deadline (using deadline=func (total HTTP bytes/AFR)) in microseconds and sends the deadline to the scheduler 202 when submitting a task to the scheduler 202. If a disk operation is over loaded, then the scheduler 202 drops some new tasks. The selected dropped tasks should belong to the first tasks created by a new session. A flag can be set by the HPE to tell the scheduler 202 if a task belongs to a new session or not.

When there are too many disk deadline misses, the scheduler 202 sends feedback to the network manager to reduce the maximum allowed connections in the server structure. This reduces the total session number.

After a disk operation is recovered and the deadline miss issue is passed over, the scheduler 202 tries to recover back to the maximum allowed connections setting in the server structure.

Hint Tracks

Figure 12:
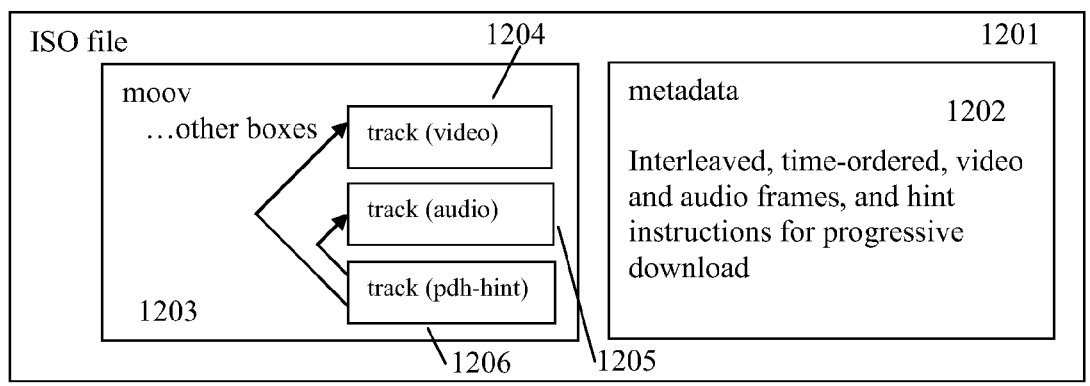
FIG. 12 illustrates a progressive download hint track location in a container file, according to a possible embodiment of the invention.

Referring to FIG. 12, in a possible embodiment, a progressive download hint track (PDH) 1206 describes to a MFD how to serve media data residing in a file 1201 using progressive download over HTTP. Only one container file 1201 needs to reside in the MFD. Within this container file 1201a user could store streams 1204, 1205, of varying bit-rates, spatial resolutions or scalable streams. The container file 1201 can also contain metadata 1202 as with MP4 container files. The PDH-Hint track 1206 would be a higher level meta box within the video file container (moov in this example) 1203 that describes to the MFD all the options available to it to support PDH.

In a possible embodiment, depending on requests from the client to adapt to varying bandwidth conditions, available client CPU resources, or by the MFD polling the network to account for network latency, the MFD side logic can make intelligent decisions as to how and what kind of bit rate, frame rate, or resolutions it should serve to best meet the conditions of the network and the requirements of the client.

In a possible embodiment, the hint track can be used by the MFD to decide the best rate or resolution to serve and then encapsulate the relevant portion of the time period of media data as a self containerized chunk of MP4 to deliver over HTTP. The media data itself that resides in the generic container does not need to be reformatted in any way.

In a possible embodiment, multiple predefined PDH hint tracks could be created that cover most of the common usage conditions to reduce the load on the MFD side.

In a possible embodiment, a single stream of media data can be used in a server composed to serve at a predefined frame rate (e.g., an H.264 stream coded at B1 kbps at 30 fps). During delivery, depending on network conditions, the MFD can choose to drop the higher temporal enhancement layers (information for which can be easily obtained by the layering boxes in MP4). As such, the rate of the PDH chunk for these lower frame rate portions (e.g., 15 fps, 7.5 fps) would be less than B1 kbps thereby providing a mechanism to quickly adapt to bandwidth fluctuations while not affecting the playback quality experience of the user to a large extent.

In a possible embodiment, an additional hint track (or higher level box) can be used to describe to various options available to support trickplay. Such a hint track (or box) can provide information to the MFD about the speed of fast-forward or rewind (2x/4x/−2x/−4x, etc.) along with precise information about relative frame offsets and playback rate that will aid the client player during playback.

In a possible embodiment, the hint track usage could also be extended to support MFD side playlists. These hint tracks can provide information about where ads or video segments need to be inserted and their exact durations. The hint tracks can also provide control mechanism information, for example, if a client player can skip or fast-forward through an ad or video segment. The hint tracks may also contain information about which ad server to contact, if needed, for the dynamic placement of ads or video segments.

MFD Policies a. An administrator is able to set policies for the MFD to operate upon. For example, the administrator may desire to have the MFD serve as many clients as possible or serve HD content and retain the quality of the HD content at the cost of serving a large number of clients.

b. The feedback from the scheduler 202 as to the amount of time that tasks have been late, the number of tasks that have been late, or any other useful metric, can be sent to the server side 201 and/or the output protocol engine 210. The server side 201 can use the information to adjust the number of clients that it is serving or even adjust the quality of the video that it delivers to certain clients in order to resolve the delivery latency. It may be that certain clients running at certain bandwidths are flexible enough to have their bandwidth dynamically lowered.

c. The output protocol engine 210 can use the information from the scheduler 202 to deny any new client connections until the scheduler 202 passes the output protocol engine 210 statistics that show that the MFD has caught up sufficiently with the desired delivery efficiency. The parameters defining what criteria are used to make such a determination may be defined by an administrator. Such parameters may include performing an action based on the number of clients that are being affected by late deliveries or the amount of latency that exists, e.g., the number of tasks that are missing deadlines.

d. An administrator may configure the origin server to notify the MFD about which content servers it should communicate with in order to retrieve content when the MFD experiences a cache miss. The origin server can instruct the origin manager 207 to obtain certain content from a specific content server using a specific protocol. The origin server can also define policies on the MFD to tell the origin manager 207 which content is cacheable and which content must be obtained from an origin server, e.g., seldom requested content.

MFD Extensions

The MFD may also be bandwidth limited at the factory. The MFD may be set to not exceed a certain peak bandwidth or number of open sessions. This allows the MFD provider to sell certain levels of service. If a customer requires a higher peak bandwidth or more open sessions, the MFD provider can remotely set the peak bandwidth or maximum number of open sessions of the customer's MFD remotely for a fee that may be a one-time fee or a recurring fee. The MFD may also automatically exceed the maximum bandwidth or maximum number of open sessions and notify the MFD provider of the amount exceeded. The MFD provider may then charge the customer a fee for the exceeded amount. This allows the customer to temporarily handle high activity bursts and not have to purchase an additional MFD or a MFD upgrade.

Load Balancer Interaction

There typically is a load balancer in communication with the peer MFDs. The load balancer can be configured to send a client request to a certain peer MFD when the request is for a specific URL. One of the peer MFDs may a send a table of what URL is available for each peer MFD. Alternatively, each peer MFD can tell the load balancer what URLs it serves. The load balancer can gather all of the information from the peer MFDs and create its own tables or database entries in order to direct client URL requests to the correct peer MFD. The load balancer may use a hashing scheme based on the URL and/or other parameters to determine the MFD to direct a URL request to. This allows the URL content to be distributed among the peer MFDs.

Monitoring and Statistical User Interface

An administrator, or the like, can look at the MFD's stored statistics that the server side player 201 records and can see via textual or graphical representations how the MFD is performing. The media manager 204 also records the number of cache hits and misses as well as what content is the most popular (hot content) or least popular. The media manager 204 can also record the origin servers that it has requested content from and the number of times such requests were made. The user interface allows the administrator to observe the content performance data in a graphical or textual representation. The user interface can present any recorded information for a specified period of time or in real time.

A graphical user interface allows the MFD to use statistical information that it can collect with regard to disk use and content accesses to display graphical charts that visually represent any of:

Histogram data showing recent data retrieval times per disk.
Disk access counters.
Number of videos per disk.
Amount of free space.
Number of videos requested.
Number of videos requested per disk.
Recent throughput per disk.
Hits/misses in the buffer cache.
Various buffer operations.
Errors (from media manager statistics, media request, etc).
Number of videos stored.
Number of videos per cache.
Number of videos created.
Number of videos deleted.
Number of media providers.
Meta-information about media providers.
Bandwidth served per cache level (memory, SSD, Disk) as well as Origin sources (HTTP, NFS, etc.).
Bandwidth served per cache device (each SSD or Disk unit). The caching logic is designed to load level across devices as the workload profile changes with respect to content.
Bandwidth and connections served per interface port.
Bandwidth and connections served per protocol (HTTP, RTSP, etc).

Figure 13:
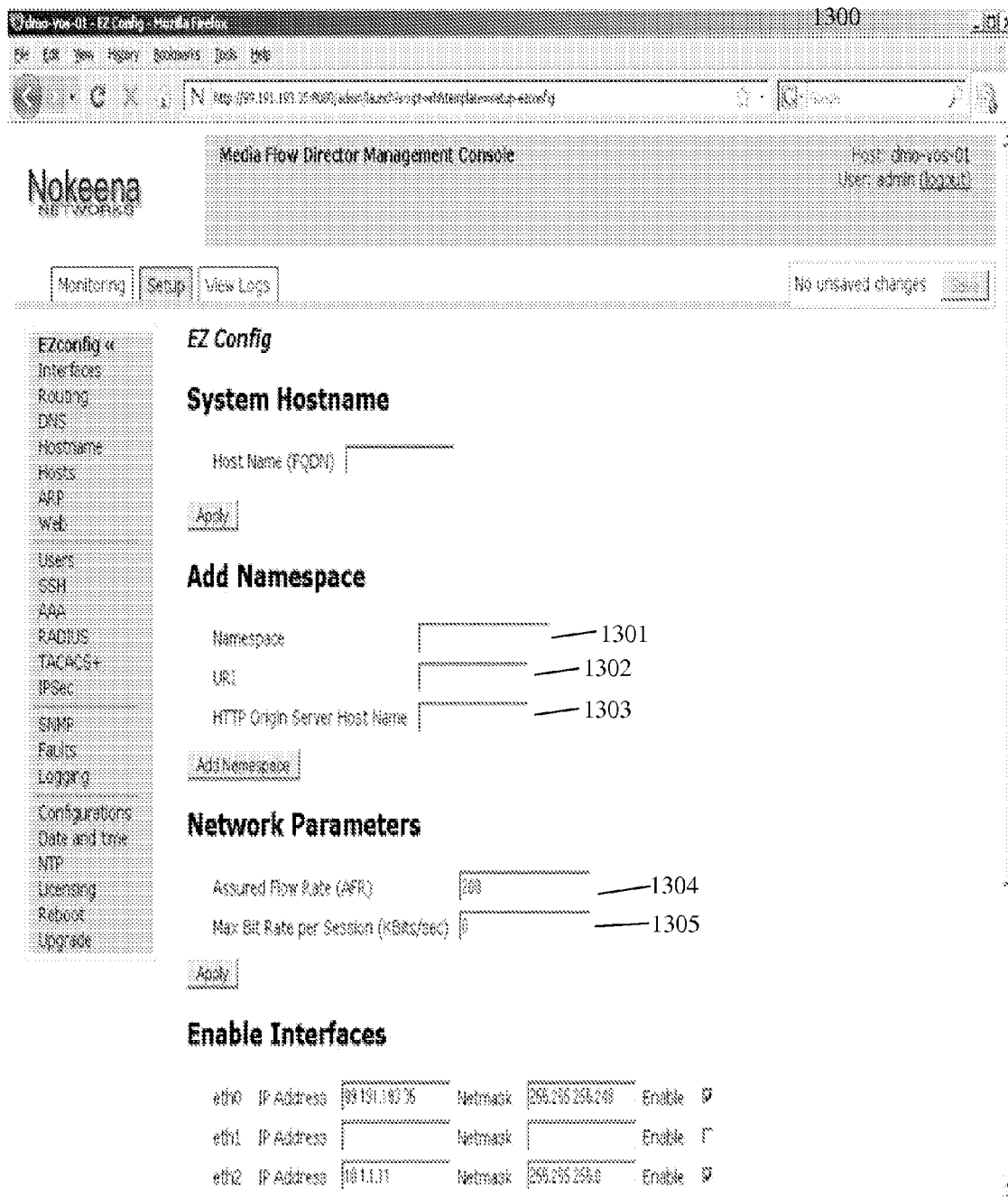
FIG. 13 illustrates a graphical user interface screenshot of a parameter specification screen, according to a possible embodiment of the invention.

In a possible embodiment, a user may configure parameters relating to the performance characteristics of the MFD. Components such as the server side player and media manager record performance statistics that are used by the graphical user interface to display statistics and graphs to the user. FIG. 13 shows a user interface screen in a possible embodiment where the user can specify parameters such as the AFR 1304 or the maximum bit rate per session 1305. The user can also specify a namespace 1301 along with its URI 1302 and the host name of the HTTP origin server 1303 for the namespace.

Figure 14:
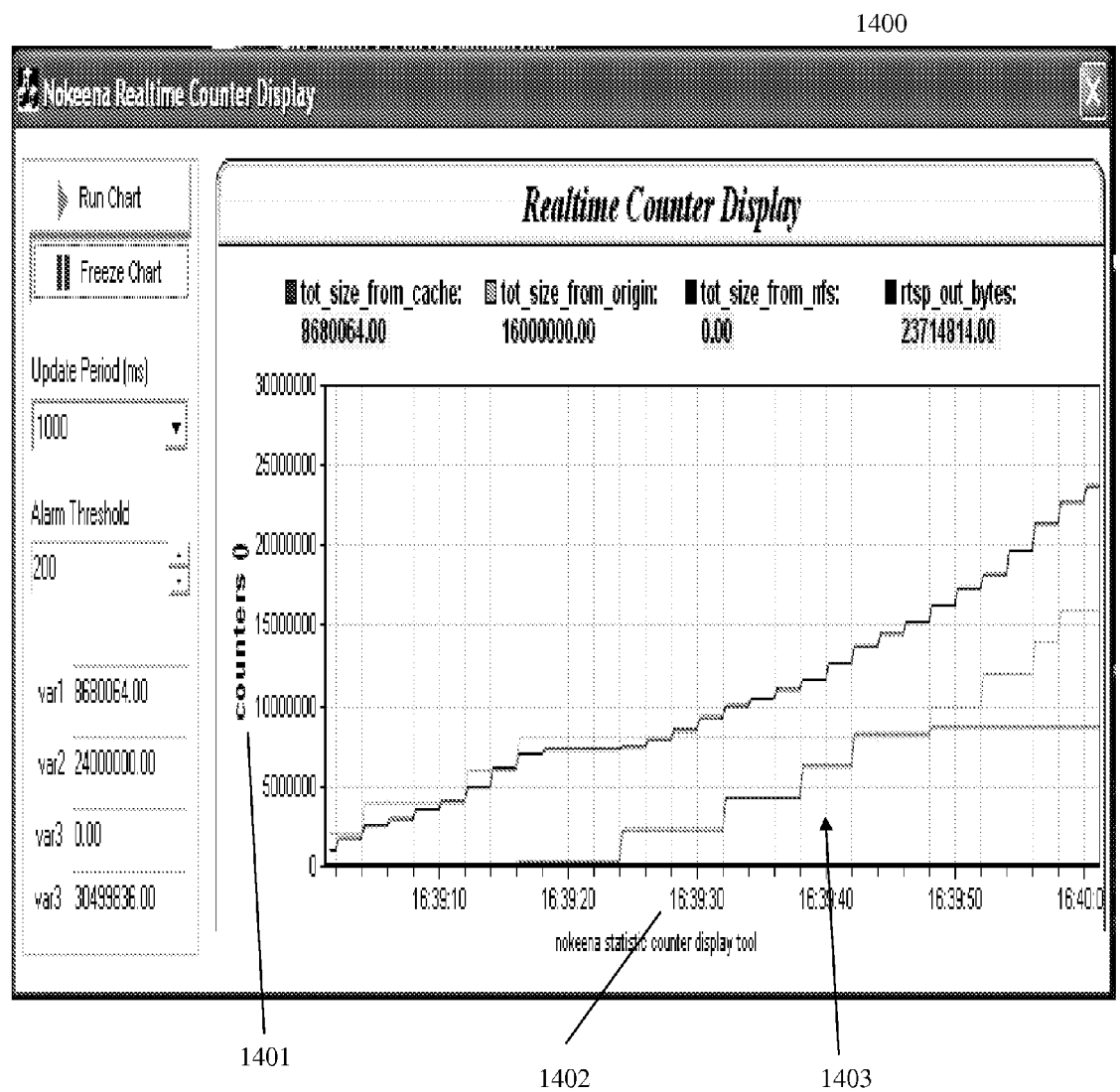
FIG. 14 illustrates a graphical user interface screenshot of a real time byte delivery monitoring graph, according to a possible embodiment of the invention.

Referring to FIG. 14, in a possible embodiment, a graphical user interface screen 1400 can show a real time graph of the aggregate number of bytes 1401 transferred from the cache, origin server, and total overall bytes delivered to clients over time 1402. The graphical user interface screen 1400 allows the user to see the actual performance of the MFD as it delivers content to clients 1403. The user can customize the policies in the MFD to adjust for cache storage, for example, to handle certain hot content that the user always wants available. The graphical user interface 1400 immediately shows the user the affect that his changes have on the MFD.

Figure 15:
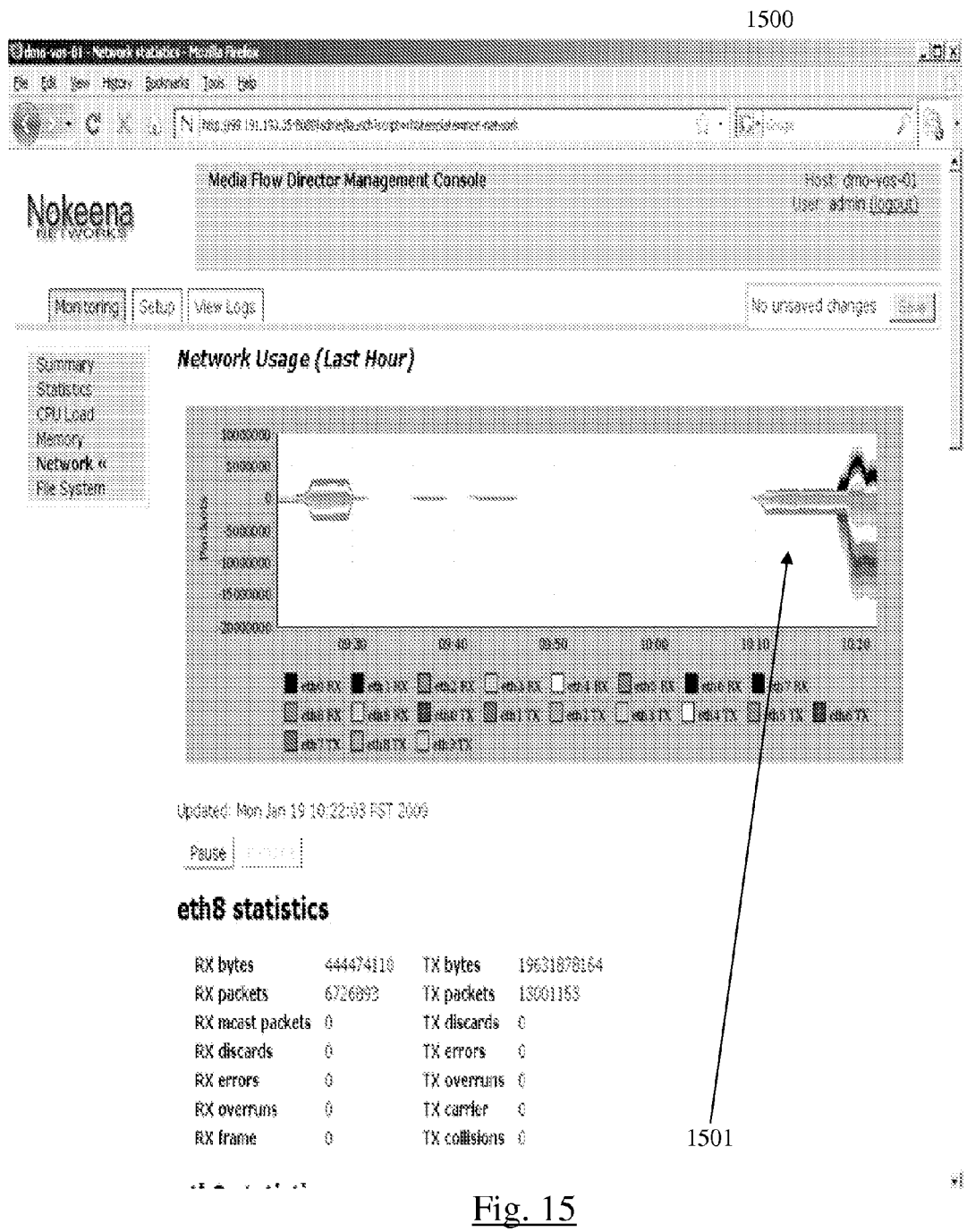
FIG. 15 illustrates a graphical user interface screenshot of a network connection performance monitoring graph, according to a possible embodiment of the invention.

FIG. 15 shows a screenshot 1500 of the graphical user interface displaying the performance characteristics over the MFD's connections 1501.

2.1.2 Media Flow Director Placement

Figure 4:
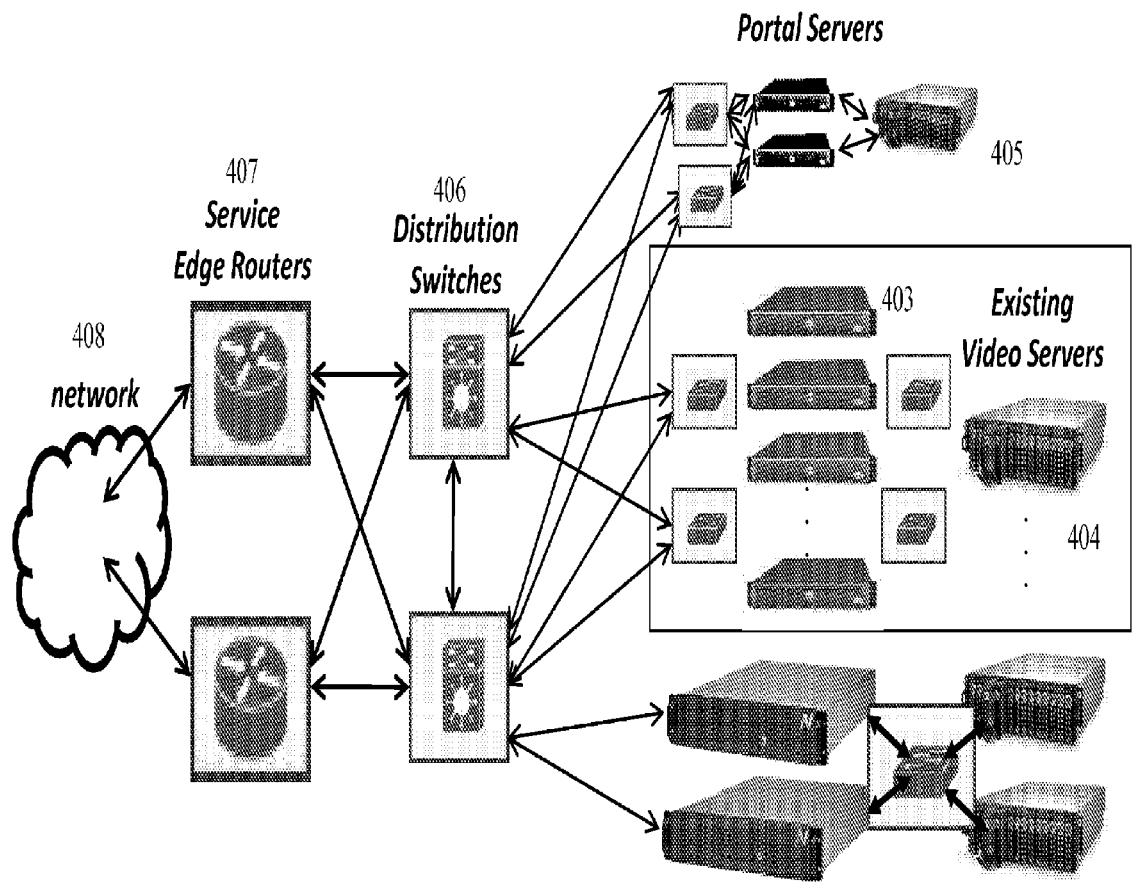
FIG. 4 illustrates a MFD deployment that replaces a conventional video server site, according to a possible embodiment of the invention.

FIG. 4 illustrates a possible embodiment using MFD's 401 to replace existing video servers 402. Existing video server implementations are typically a group of file servers 403 that cache content from an origin server or a group of origin servers 404. The content from the origin servers 404 are mirrored across many video servers 403. A user, via a client, visits a web page on a portal server 405 to search for video content. The user selects a video from the web page via a link on the page. The URL is sent to a DNS server that resolves the URL to an IP address that a load balancer is responsible for. The client is passed the resolved IP address which is used by the client to make the video request. A router, in a group of edge routers 407, routes the request to the load balancer in a distribution center 406. The load balancer receives the request and forwards the URL request to a video server in the video server cluster 402. The URL request may inform the video server the bit rate of the requested video that the client is expecting. The video server is a file server that has no knowledge of the characteristics of the file that it is delivering other than the fact that it must deliver a certain bit rate version of the video to a client. Typically the name and content is opaque to the video server. Each bit rate of the video is typically a named file. The video server streams the video file to the client and attempts to deliver the video to the client such that the client's video buffer does not become empty.

The client must buffer the received video in order to cover for delays in the streaming of the video from the video server. The client's buffer is meant to give the user a continuous viewing experience. Given that the video servers are serving large amounts of videos to many clients, delivery delays that are created by a server running out of bandwidth or by network delays to a client are frequent and client buffers become empty. As a result, the user either sees the video stream stop playing until the buffer starts to fill again or, for small video files, waits until the entire video has loaded into the buffer before the video starts to play.

In a possible embodiment, one MFD has the ability to achieve a throughput of 10 Gbps+ resulting in a single MFD replacing ten or more video servers. Two MFDs 401 can replace a bank of 20 video servers. The MFDs 401 communicate with origin servers 402 in order to obtain video content when a MFD receives a request for URL content that the MFD does not have in storage or the when MFD accepts new video content from an origin server. The MFDs are a direct replacement of video servers and the infrastructure of the portal servers 405, edge routers 407, and distribution switches 406 remains the same.

Figure 5:
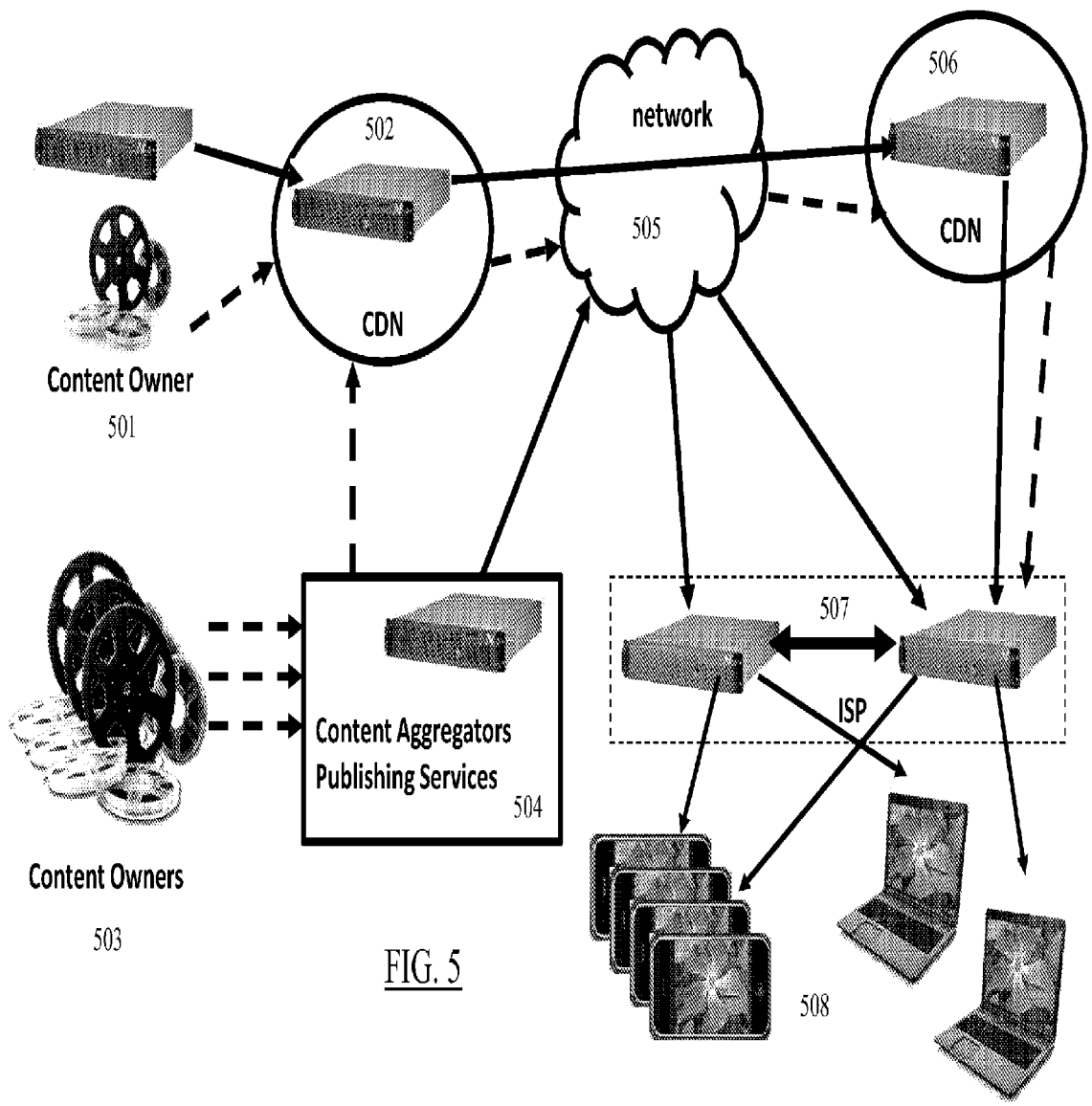
FIG. 5 illustrates an MFD network delivering content to client systems, according to a possible embodiment of the invention.

FIG. 5 illustrates the placement of MFDs at edge and/or origin locations. In this example, the dashed lines are the data paths for a conventional implementation. A MFD may be installed at a content owner's site 501, a CDN 502, 506, a content aggregator site 504, or an ISP. Any combination of locations may have a MFD installed, resulting in faster and more reliable content delivery to clients 508. For example, when two MFDs are installed at an ISP 507, the MFDs are deployed somewhere in the ISP network. This can be either in the same data center in a cluster or in different data centers but in the same ISP access network. The MFDs can communicate with each other to deliver the content more efficiently because, if the MFDs can retrieve the content from within the same network, it is more efficient than retrieving the content from across different and/or multiple different networks or from an origin site. If a large content aggregator 504 deploys an all-MFD private delivery network, the content aggregator sees even more efficiency since the MFDs can use private protocols to processes cache miss processing, pre-staging, data collection, etc., even more efficiently.

When an all-MFD implementation is achieved, there is a dramatic increase in efficiency due to the MFD's ability to retrieve content via the most efficient route.

Note that the term "video content" has been used in embodiment descriptions throughout the text. The term "video content" may be replaced by any media type in the embodiments discussed throughout as the MFD is adaptable to deliver any type of content files, such as: media (audio, pictures, etc.), games, software, HTML, scripts, etc.

Figure 16:
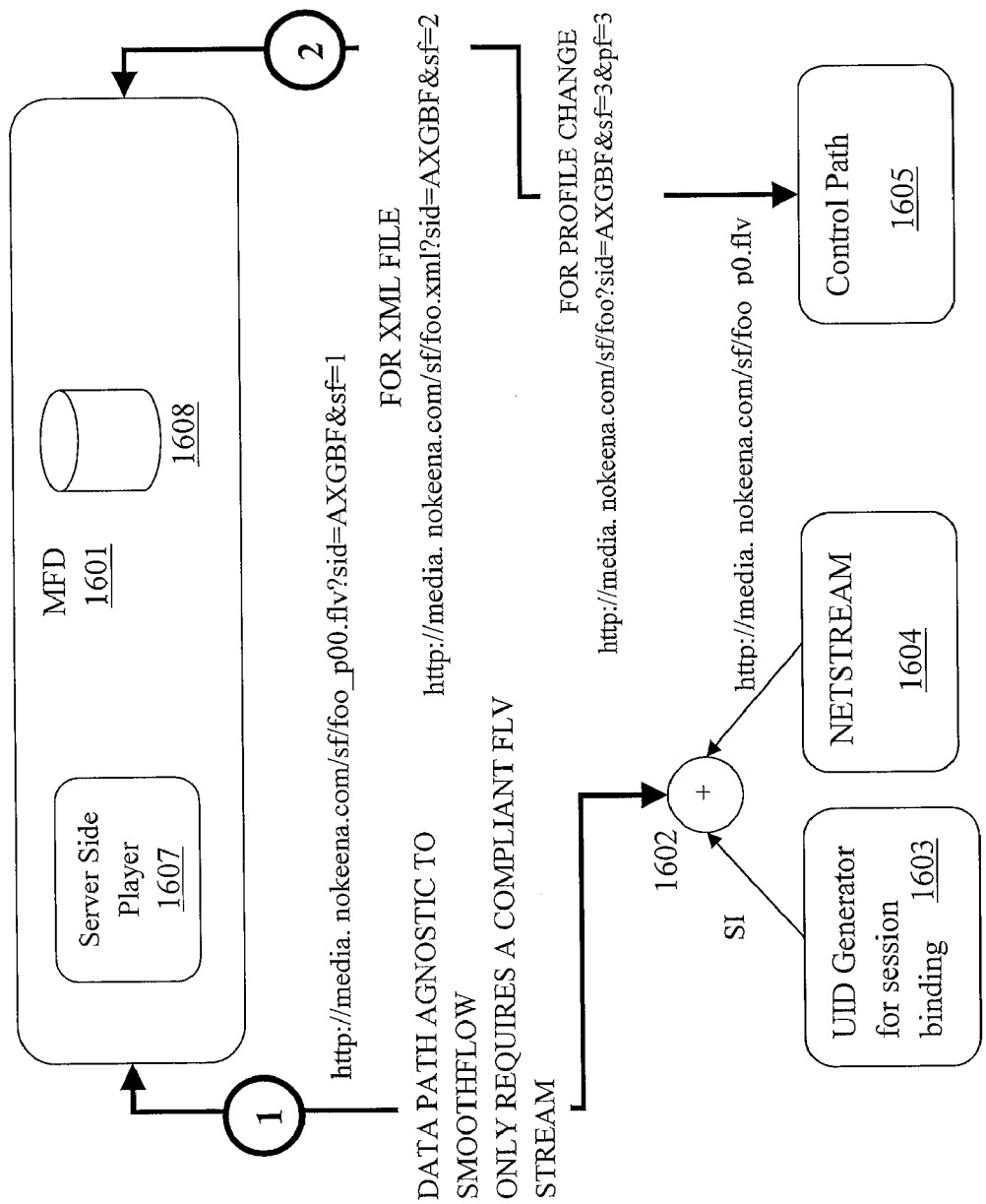
FIG. 16 illustrates an media flow director (MFD) in communication with client systems across a network, according to a possible embodiment of the invention.

2.2 Variable Rate Video Delivery Over a Network 2.2.1 Smoothflow Video Architecture FIG. 16 illustrates a possible embodiment showing the dataflow of a media flow director (MFD) 1601 that is configured to deliver video content across a network. Video content files are stored on at least one local storage device 1608 accessible by the MFD 1601. For a certain video content, a content provider can provide several content files that contain the video content where each file is encoded for a different bit rate, e.g., 100 Kb, 200 Kb, 500 Kb, 1 Mb, 2 Mb, etc. In a possible embodiment, incoming content files from origin servers are pre-processed by the MFD 1601 or, optionally, by a central processing server, to create file images that are chunked such that each chunk of the file image are sized according to a configurable parameter, e.g., one second, two seconds, etc. The size of the chunks allows the server side player (SSP) 1607 in the MFD 1601 to provide seamless transition between different bit rate files (smoothflow) as described below. In another possible embodiment, the chunks are logical chunks that have their boundaries tracked by an index table or any other type of data structure. The SSP 1607 handles logical chunks in much the same manner as with physical chunks.

In a possible embodiment there are no restrictions on the client video player. The client video player can be a standard video player that handles HTTP progressive download. The player does not need to be modified to handle progressive downloads from the MFD 1601.

Client-MFD Interaction

In a possible embodiment, the MFD 1601 is based on a dual channel approach with session binding. A client player establishes a media link and a control link with the MFD 1601 that are bound together using a unique session ID (SID) generated by the client player. Video data is delivered using the media link while the control link is used by the client player to signal to the MFD 1601 the appropriate adaptation points due to bandwidth fluctuations. The control channel can be used as a two-way link to send and receive requests/control data.

In a possible embodiment, the user clicks on a file link on a Web page to view a file. The client starts a player, e.g., a Flash player or a Silverlight player, on the client, for example. The client player generates a unique SID for each session and provides this ID as a query parameter along with the request for the video title to the MFD 1601. This session ID is used in all subsequent communications with the MFD 1601. In this example, the client player creates a user ID, using a UID generator 1603, that is a unique ID associated with the client. UID generator 1603 can, for example, use a combination of a pseudo-random number and the current time (with seconds and milliseconds as a part of the ID) and possibly limit the length of the ID to be less than 36 bytes. The client player combines 1602 the UID with the file request 1604 that contains the domain and file name. In a possible embodiment, a smoothflow (sf) command state may also be included. Example command states are shown in Table 1.

In an example of a URI in FIG. 16, the file being requested is foo_p00.flv, the session ID is AXGBF, and the sf is set to 1.

TABLE 1

Smoothflow State Table

| SF query parameter state | Comments |
| --- | --- |
| State - 0 | No Smoothflow/Disable Smoothflow |
| State - 1 | Smoothflow Media Data Request |
| State - 2 | Smoothflow Client Meta Data Request |
| State - 3 | Smoothflow Control Signal |
| State - 4 | Smoothflow Pre-stage request via Trigger |
| State - 5 | Smoothflow Internal Fetch for Trigger/Cache Miss |

The file request is a standard HTTP file request that can be interpreted by any HTTP server. This allows the combined HTTP request to be processed by any HTTP server. For example, if the MFD fails, the fallback position could be to forward the HTTP request to a third party content server. The third party content server would see the HTTP request and ignore the UID and sf command state and simply send the file to the client player. This allows the MFD system to easily integrate into existing content delivery systems.

The UID is used by the MFD 1601 to bind the media data delivery with any control data received from the client player.

When the MFD 1601 receives the HTTP request, it sees the sf command state and recognizes that the request is a smoothflow request. The MFD 1601 labels/identifies the connection with the provided SID and sets up a session object that is shared between the media channel and control channel. The MFD 1601 maps the URI to an internal file and retrieves the MFD metadata file that is associated with the requested file. If the metadata file is present, then the server side player (SSP) 1607 parses its contents and sets the smoothflow status in this session to true. The SSP 1607 extracts information from the metadata file such as: available bit rates, how many video files are available, what are the chunk divisions in the video files, how small are the chunk intervals in the video files, what are the total divisions in the video file, etc.

The MFD 1601 then starts to send out the first chunk of the video file to the client player. The MFD 1601 has a video delivery loop scheme where, when a chunk is found to be delivered, the MFD 1601 sends the next chunk out. The SSP 1607 is requested to remap and provide the URI of the next chunk so that the MFD 1601 can send the next chunk of data over the connection. For example, the filename for the first chunk is foo_p00_c0000000001.flv. The SSP 1607 subsequently remaps the URI to fetch the next chunk as requested to send over the connection using the filename foo_p00_c0000000002.flv. Before the next chunk is served, the SSP checks the status of the shared session object that this session shares between the media and control channels to check if the control channel has altered the state of any parameters in the shared session object. This continues until the end of the playback duration. Note that any progressive download mechanism can be adapted to by the MFD 1601 to adapt to bandwidth changes as described throughout the disclosure.

If the metadata file is absent, the SSP 1607 documents that smoothflow is not supported for this file by setting the smoothflow status to false. The SSP 1607 can treat this as a cache miss and initiate a pre-processing trigger to ingest and prepare content for smoothflow for future requests. The SSP 1607 can then start serving a file that is at a default bit rate supplied by the customer/content provider to the client player.

When a subsequent control connection comes in with the same SID, requesting the XML file for the client. Client meta data files are requested when the 'sf' state parameter has a value of '2'. MFD checks the session object status for smoothflow flag and depending on status will fetch the XML file and deliver if present (indicating we support smoothflow), or reject providing a response that file not found (indicating smoothflow not supported). This XML file tells the player of the various profiles available for this asset. If client receives the XML file, then in the future it can explicitly request for relevant adaptation profiles. Using Table 1, adaptation requests are denoted by the sf state parameter being received as the value of 3.

2.2.2 Transitioning Between Different Bit Rates

In a possible embodiment, the client player could be configured to be able to send control commands to the MFD 1601. The client player can create an HTTP request for an XML file from the MFD 1601 using the control path 1605. The HTTP request contains the UID previously created by the UID generator 1603. The MFD 1601 sees that the HTTP request is for the XML file that describes available bit rates and features. The MFD 1601 looks in the MFD metadata associated with the video delivery session as indicated by the UID in the HTTP request. The MFD 1601 retrieves the XML file and sends it to the client player.

Once the client player has received the XML file, it has the ability to tell the MFD to switch between bit rates. In a possible embodiment, an application exists on the client that can monitor resources on the client such as: the bandwidth, the CPU resources, memory resources, etc. This monitoring application can detect if the client is having a shortage of bandwidth or if the bandwidth has increased, for example. The client can then tell the MFD 1601 to switch bit rates via an HTTP request (containing the UID previously created by the UID generator 1603) using the control path 1605. The HTTP request can contain an sf command state that tells the MFD 1601 that the profile (pf) request follows. The MFD 1601 sees the pf that has been requested. If the pf that is being requested exists in the MFD metadata, then the MFD 1601 changes the profile of the video that is being delivered.

When the MFD 1601 gets to the point in the video delivery loop where the next chunk is to be delivered, it sees that the profile has been changed for the video. The MFD 1601 looks into the video cache/storage for the new bit rate and finds the chunk that corresponds to the chunk that was supposed to be delivered in the previous profile. The MFD 1601 then sends the new remapped chunk corresponding to the revised profile to the client Player.

The client player simply plays the received chunk. The user never notices any dropped frames or pauses because the client player has received the chunk at the delivery rate that was needed by the client player. The transition between bit rates is seamless to both the user and the client player.

In an alternative possible embodiment, the MFD 1601 can detect any bandwidth changes between the client and the MFD 1601. The MFD 1601 monitors the bandwidth delay between the MFD 1601 and the client using, for example, the round trip time (RTT) in the TCP stack to estimate the last mile bit rate variation to the client. The RTT time tells the MFD 1601 if there is congestion down the line.

Using the RTT, the MFD 1601 can estimate the available bandwidth between the MFD 1601 and the client. If the effective bandwidth has changed, the MFD 1601 can adjust the bit rate to the bandwidth change. For example, if the bandwidth has improved, the MFD 1601 can send a higher bit rate of the video or if the bandwidth has degraded, the MFD 1601 can send a lower bit rate of the video to the client.

When the MFD 1601 has detected a bandwidth change, it can look at the MFD metadata for the video and find a bit rate that is available for the video and is appropriate for the available bandwidth. The MFD 1601 can change the profile of the video as described above.

When the MFD 1601 gets to the point in the video delivery loop where the next chunk is to be delivered, it sees that the profile has been changed for the video. The MFD 1601 looks into the video cache/storage for the new bit rate and finds the chunk that corresponds to the chunk that was supposed to be delivered in the previous profile. The MFD 1601 then sends the new remapped chunk corresponding to the revised profile to the client Player.

In another possible embodiment, both client resource monitoring and MFD 1601 bandwidth monitoring can be combined. The client can monitor resources on the client such as: the CPU resources, memory resources, etc. If the client detects that the resources indicate a decrease or increase in the client's ability to display the video, the client can then tell the MFD 1601 to switch bit rates via an HTTP request as described above. The MFD 1601 sees the pf that has been requested. If the pf that is being requested exists in the MFD metadata, then the MFD 1601 changes the profile of the video that is being delivered.

On the MFD side, the MFD 1601 can detect a bandwidth change as described above. It can look at the MFD metadata for the video and find a bit rate that is available for the video and is appropriate for the available bandwidth. The MFD 1601 can then change the profile of the video.

As described above, the MFD 1601 changes the bit rate of the video when it discovers that the profile has changed. The MFD 1601 looks into the video cache/storage for the new bit rate and finds the chunk that corresponds to the chunk that was supposed to be delivered in the previous profile. The MFD 1601 then sends the new remapped chunk corresponding to the revised profile to the client player.

The combination of the MFD 1601 bandwidth detection and the client side resource monitoring provides finer control of the bit rate for the video being delivered and displayed.

Server Side Player

The server side player 1607 is primarily responsible for the encapsulation and enforcement of video specific logic for each video stream. Such an enforcement could happen both at the inbound side when a request is made to the MFD 1601 for a video stream or at the outbound side when a specific video stream is heading out for delivery.

The server side player 1607 interprets a URI received from an output protocol engine, decides what bit rate is to be used for the requested video content, handles what is to be sent, and where to play the video from (what frame within the video to start streaming from). The server side player 1607 is bit rate aware and knows the bit rate of the video content that it is trying to serve. It can use information obtained from an optimized network stack to find out what the effective bandwidth is for the client in the last mile. The server side player 1607 can also authorize the request.

The server side player 201 is video-aware as opposed to a typical file server that does not know what the video file format or video content is. When the server side player 1607 changes the bit rate after the video has started, the server side player 1607 already knows where the associated frame exists in the different bit rate version, so the server side player 1607 can easily change bit rates without the client having to send a different offset for the new bit rate. A possible embodiment stores several different bit rate versions for a specific video content. The server side player 1607 stores index tables for each of the bit rate versions so the server side player 1607 can quickly refer to a table to find the associated frame for the new bit rate video.

File Metadata

Content files are stored on at least one local storage device that is accessible to the MFD 1601. The content provider provides the MFD with a metadata file associated with each set of video files that the content provider has provided. The metadata describes the names of any metadata files, e.g., an XML data file, that are available to download to a client video player that, for example, describe to the video player available bit rates for the video content and/or trick play feature commands that can be sent to the MFD. The metadata also tells the MFD 1601 the filenames for video files associated with each available bit rate.

The MFD 1601 maintains its own set of metadata for the set of video files that incorporates the metadata provided by the content provider. The MFD metadata format is extensible. Features, e.g., trick play features, can easily be added to the metadata. Each feature can have a tag header which can have all of the fields that are required for that feature and offsets to data sets that the feature may require. The data can be guided by a generic header at the top of the file. The header can have information as to the number of features supported in a specific metadata file with their feature identifiers. This information can be directly used by the MFD 1601 to move quickly to a required feature tag and from there on to the data set.

The MFD 1601 also creates client metadata files that tell the client player about the various profiles available for a set of video files.

Artifacts Occurring During Bit Rate Transition

Artifacts may arise when switching from one bit rate stream to another bit rate stream. In a possible embodiment, video data can be encoded in such a manner that there is an overlap of video data between chunks. Initialization and playback of the next chunk starts, sans rendering, when the previous chunk enters the overlap region itself. When the actual chunk transition happens, frame jitter is reduced/removed. Smoothflow can be accomplished by switching bitrates of the video at pre-determined chunk boundaries. To minimize jitter, the SSP 1607 preloads a portion of chunk that it is going to switch to; this makes chunk transitions seamless. To accomplish this, the SSP 1607 internally uses a timer that triggers pre-loading of the next chunk when a configurable threshold is reached. Additionally, for MP4 files, there is a finite delay in decoding and rendering to a video canvas. To overcome this, the GUI has two video canvases—one having the chunk that is currently played back and another video canvas for the pre-loaded stream. These video objects are then swapped at chunk boundaries.

2.2.3 Media Flow Director in the Network

Figure 17:
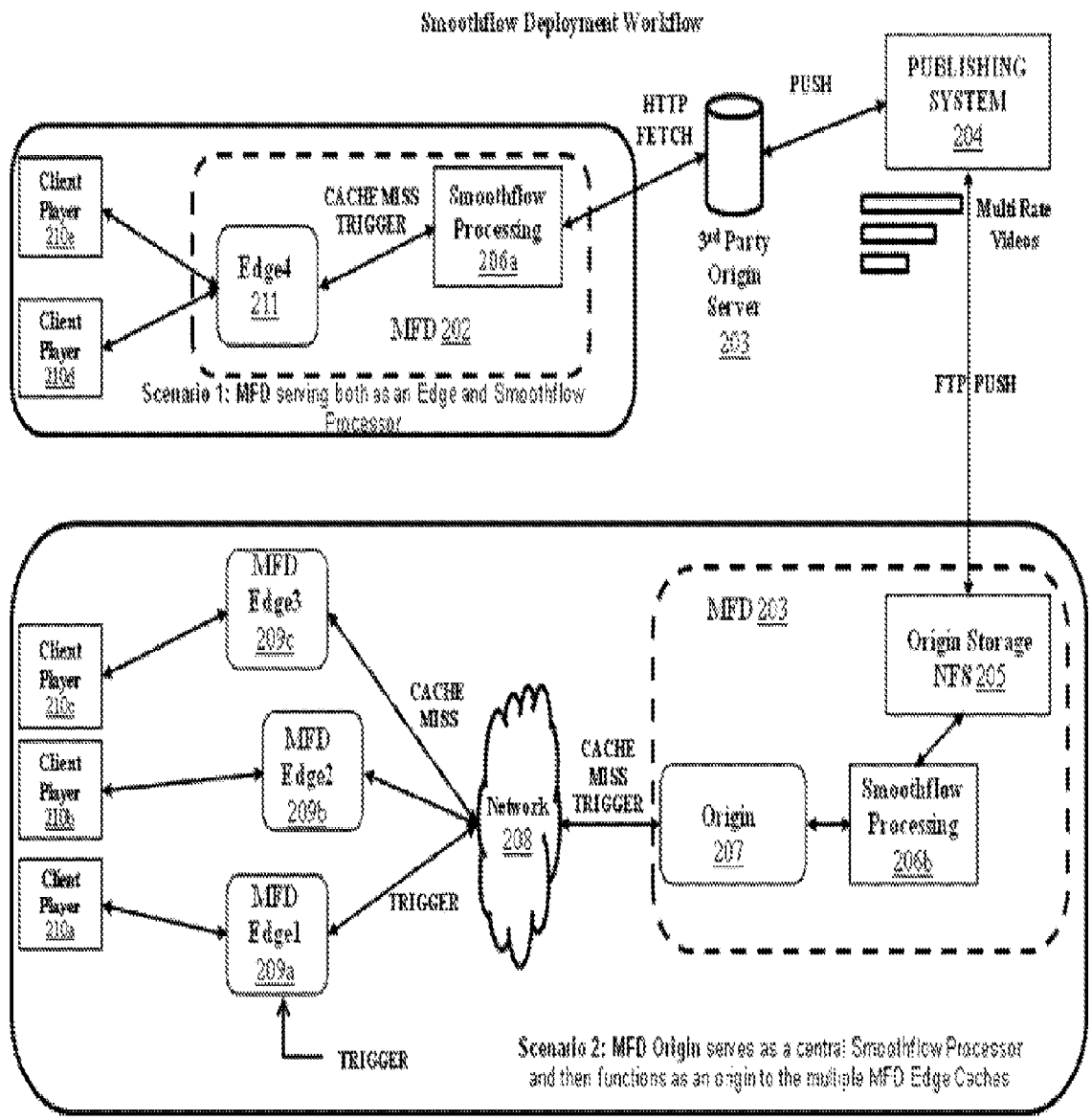
FIG. 17 illustrates MFD applications in a network, according to a possible embodiment of the invention.

Referring to FIG. 17, two examples of MFD 1702, 1703 network applications are shown. In one example, the MFD 1702 is tasked to be both a smoothflow processor 1706a and an edge server 1711. A publishing system 1704 (described below) allows a content provider to prepare files for smoothflow delivery. The content provider creates multiple bit rate files for a certain content using the publishing system 1704. The files can be stored on an origin server 1703 that acts as a repository where the files are stored along with other content files.

The edge server 1711 in the MFD 1702 serves requests for video data from the client players 1710d, 1710e across a network connection such as the Internet, intranet, etc. When a request for content from a client player results in a cache miss, the edge server 1711 acts on the cache miss trigger and sends a request for the content to the smoothflow processing system 1706a. The smoothflow processing system 1706 obtains the files associated with the content from the origin server 1703. In a possible embodiment, the smoothflow system 1706a may simply pass on the default files for the content to the edge server 1711 in order for the edge server 1711 to serve the content to the requesting client player as soon as possible. The smoothflow processing system 1706a has time to pre-process the content files as described below for later client player requests. The pre-processing enables bit rate switching and trickplay functionality for the content. Once the files have been pre-processed, the smoothflow processing system 1706a sends the pre-processed files to the edge server 1711 for storage on one or more storage devices in communication with the edge server 1711.

In a possible embodiment, the trigger can be based on a pre-processing request. A pre-processing request is one where a customer can specifically send a trigger to the edge server 1711 to pre-process and ingest content even before the edge server 1711 receives a request from a client player for the content. The edge server 1711 acts on the pre-processing trigger and sends a request for the content to the smoothflow processing system 1706a. The smoothflow processing system 1706 obtains the files associated with the content from the origin server 1703. The smoothflow processing system 1706a pre-processes the content files as described below. Once the files have been pre-processed, the smoothflow processing system 1706a sends the pre-processed files to the edge server 1711 for storage on one or more storage devices in communication with the edge server 1711.

In a second example, the MFD 1703 operates as a central smoothflow content server to other MFD edge servers 1709a-1709c in communication with MFD 1703. After a content provider completes the creation of files relating to a content on the publishing system 1704, the publishing system 1704 pushes the content files to the origin storage system 1705 in the MFD 1703. The origin storage system 1705 is a repository for published files.

The smoothflow processing system 1706b obtains files for pre-processing from the origin storage system 1705. The smoothflow processing system 1706b pre-processes the content files as described below. The pre-processing enables bit rate switching and trickplay functionality for the content. Once the files have been pre-processed, the smoothflow processing system 1706b sends the pre-processed files to the origin server 1707 for storage on one or more storage devices in communication with the origin server 1707. The origin server 1707 stores pre-processed content files for distribution to edge servers.

Edge servers 1709a-1709b serve requests for video data from the client players 210a-210c across a network connection such as the Internet, intranet, etc. The edge servers 1709a-1709c are in communication with many client players. The edge servers 1709a-1709c also communicate with the MFD 1703 across a network connection such as the Internet, intranet, etc. When a request for content from a client player, for example client player 210a, results in a cache miss on an edge server, for example edge server 1709a, the edge server acts on the cache miss trigger and sends a request for the content to the origin server 1707 in MFD 1703. The origin server 1707 sends the pre-processed smoothflow content files to the edge server 1709a. The edge server 1709a serves the content to the requesting client player 210a using the pre-processed smoothflow content files.

In a possible embodiment, as in the example above, the trigger can be based on a pre-processing request. A customer can specifically send a trigger to any of the edge servers 1709a-1709c to pre-process and ingest content even before the edge server receives a request from a client player for the content. The origin server 1707 sends the pre-processed smoothflow content files to the requesting edge server. The edge server stores the pre-processed smoothflow content files on at least one storage device in communication with the edge server.

2.2.4 Preparing Smoothflow Files

Figure 18:
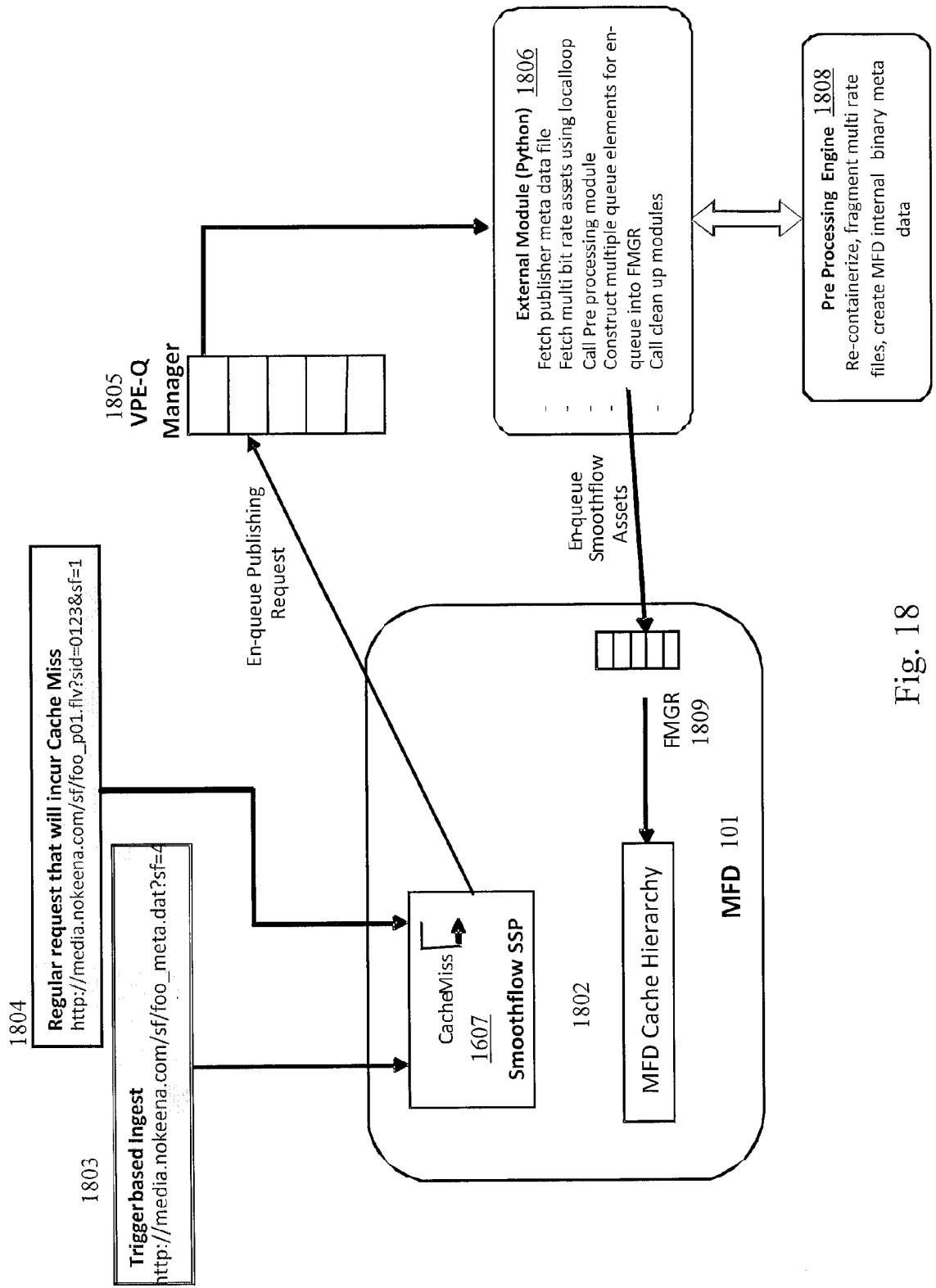
FIG. 18 illustrates a publishing system that delivers video files to an MFD, according to a possible embodiment of the invention.

Referring to FIG. 18, a possible embodiment of smoothflow pre-processing of content files in an MFD 1601 is shown. Fetching and pre-processing of content files (ingesting) can be triggered in two ways. The first way is for a specific request for a pre-processing of a content to occur 1803 using a specific sf query parameter from Table 1. In this form of ingest, MFD 1601 specifically receives a request to trigger/start the pre-processing/ingest of smoothflow content from a publisher. MFD 1601 internally decomposes this request into the relevant namespace and if the virtual player type specified matches the smoothflow player type, then by recognizing the state of sf, "4" in this case, MFD 1601 is able to initiate the pre-staging process.

The second way is a cache miss caused by a client player request for content 1804. In this form of ingest, MFD 1601 is unable to fetch the internal metadata file, upon which it remaps the request to serve the regular single bit rate video file. Because MFD 1601 knows that smoothflow assets are unavailable for this video, it internally creates a request to initiate the pre-staging process for this content. The VPE-Q maintains a hash table that tracks the files that have been queued to be processed by it. If a request for smoothflow is duplicated, it automatically rejects it if there is an entry for the asset in the VPE-Q (either in the queued, processed or processing state).

In order to process the content files, MFD 1601 has a video processing engine queue (VPE-Q) that runs as a daemon to handle requests specific to VPE modules and directs the requests to the relevant modules based on the signaling attributes that are provided with the queue elements.

Both the trigger and cache miss ingest commands create queue requests in the VPE-Q pipeline for processing. The daemon processes each queued element and calls an external module 1806 that starts the pre-processing ingest workflow. If the pre-processing job report indicates an error, the external module 1806 has a fixed number of retries to correct the situation. When it runs out of tries, it messages back to the VPE-Q manager 1805 that the element cannot be prepared for smoothflow. The SSP 1607 then automatically reverts to a single bitrate delivery mechanism for this asset.

The VPE-Q manager 1805 provides the external module 1806 with the necessary parameters to initiate the ingest process. The external module 1806 fetches the content provider-provided metadata file that describes their published content. Once the file is received, the external module 1806 parses the data in the file to obtain information about the number of multi bit-rate files. The external module 1806 subsequently retrieves the individual video files.

The external module 1806 calls the pre-processing module 1807. The pre-processing module 1807 re-containerizes the files, fragments the files at the recommended or configured intervals, and produces, as its output, multiple chunks/fragments of individual video files. The pre-processing module 1807 produces the MFD internal metadata, the client xml meta file, and a job status report per request. The external module 1806 queues all the fragments to the file manager queue (FMGR) 1809 of MFD 1601 for cache ingest into the MFD cache hierarchy 1802.

Figure 19:
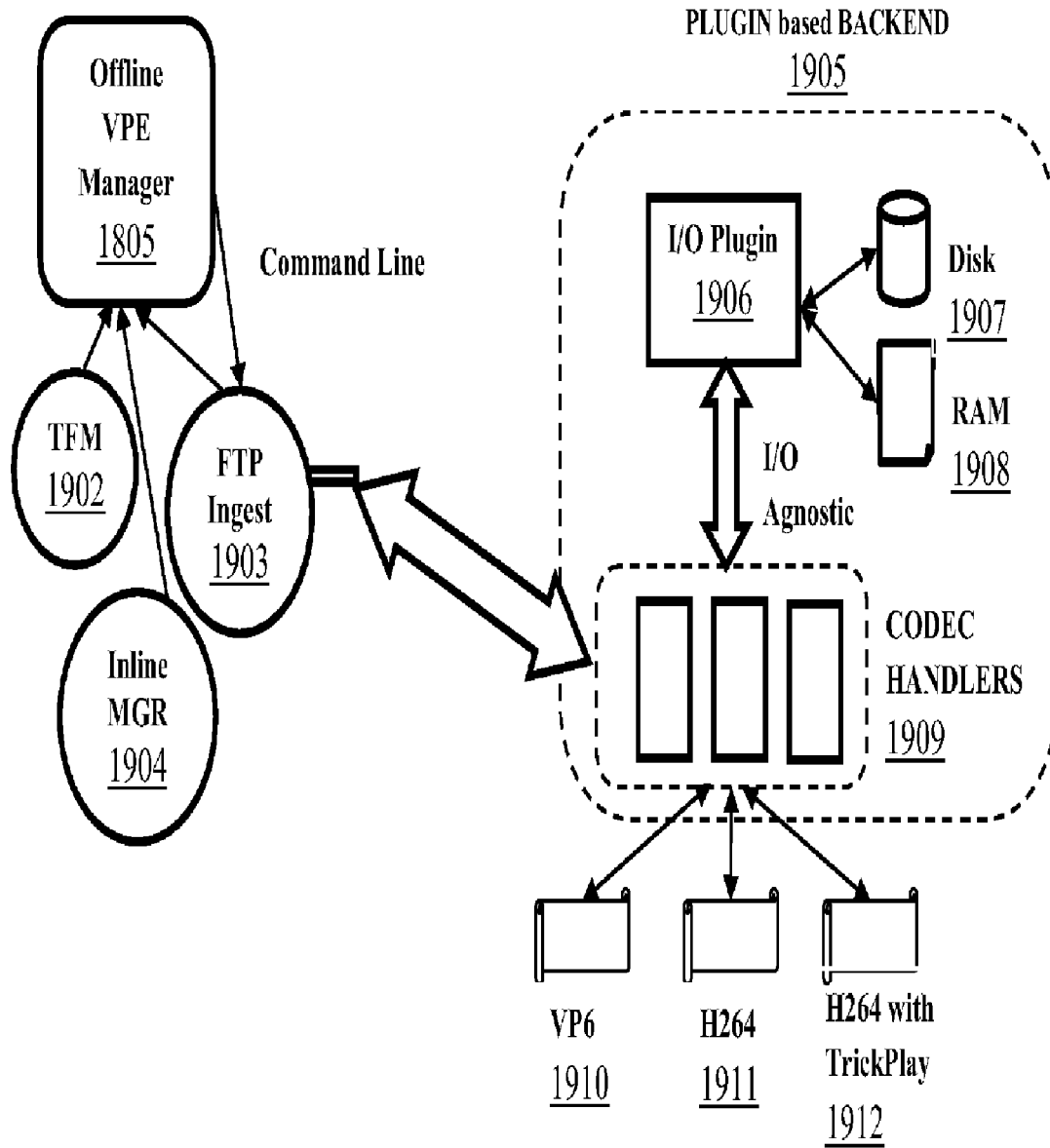
FIG. 19 illustrates a preprocessing engine that prepares video file for delivery by the MFD, according to a possible embodiment of the invention.

Referring to FIG. 19, the VPE-Q manager 1805 in a pre-processing engine 1808 data flow structure is illustrated. The input to the pre-processing engine 1808 can be via the external module 1806 which is in turn controlled by the VPE-Q manager 1805. The pre-processing engine 1808 prepares video data for feature rich delivery via MFD 1601 for smoothflow, trick play etc. The preparation processing for smoothflow includes parsing the input video data packets and identifying I-Frames closest (in timescale) to a pre-configured smoothflow period. These points are called sync points. The video packets at these sync points are then containerized as per the FLV V9.0 format specifications into separate video objects called "chunks".

The pre-processing engine 1808 is completely architected to work with plugins 1905. The codec handling 1909 and I/O handling 1906 are plugin based. More codecs can easily be added to conform to the smoothflow delivery system by implementing appropriate interfaces exposed by the pre-processing engine 1808. Likewise, the system can switch between a buffer based 1908 or file/disk based 1907 I/O seamlessly by conforming to the I/O interfaces. Any codec interface 1910-1912 can be able to process data into individually decodable chunks of data which can be appended to create a consolidated stream or can be played independently. The codec architecture can also generate additional metadata for providing additional features like trick play using the smoothflow delivery framework.

In a possible embodiment, the video data are stored as building blocks that can be combined in any order (heterogeneously, meaning any multiple of these building blocks can be mixed to form a heterogeneous stream) to build the stream without the receiver knowing the order and without changes needing to be clearly documented. Data can be combined in any order to deliver features other than smoothflow. For example:

Trick play—where only the I-frames are combined in a particular sequence based on the speed and direction of the trick play request.

Ad insertion—where ads can be combined or mixed seamlessly.

Choice of audio language by changing the audio packets being interleaved.

Live streaming—by converting data into the building blocks in real-time and transmit them over the wire on PDL.

The pre-processing engine 1808 can generate the prepared video data, metadata for the server, metadata for the client, and a job status report that gives the status of each job. The job status report can report the following in a simple text file:

number of profiles processed
total data processed
time taken for processing
rate at which data was processed
error codes (if any)

Video File Structure

Referring to FIG. 20, FLV 2001 and MP4 2002 file structures are shown. In the FLV file format 2001, the header information is spanned across the entire file, whereas for the MP4 file 2002 the entire header information 2010 is concentrated right at the beginning. Such a form of header layout makes the FLV format very friendly for progressive downloads as compared to the MP4 format. In a possible embodiment, due to the inherent advantages provided by the FLV structure, storing H.264/AAC content in FLV containers rather than in MP4 aids in the smoothflow delivery framework. Below are a few features between the two formats in light of progressive download for comparison:

| Factor | FLV | MP4 |
|---|---|---|
| Fast Start | FLV has a 13 byte header 2003 followed by data packets 2004, 2006, 2008 which is very conducive for fast start. Also FLV's header size is independent of the video sequence length. | MP4 needs to download the entire header 2010 before playback starts and these headers may be quite large for longer video sequences, in the tune of a few Mbytes. |
| Multi Bit Rate Switching | Since header data for each packet is self contained within the packet, it makes it easier to switch across different rates. | MP4 headers have absolute offsets to start points of every frame making it very difficult to mix data from another bit rate. |
| Size | FLV has a fixed 11 byte header per video/audio packet 2005, 2007, 2009 which makes it marginally bigger than an mp4 file. This metadata is spread equally across packets making it packet-wise decodable. | MP4 contributes to around 4-6 bytes per packet of data but all the data is stored at the top of the file and needs to be downloaded before playback starts. |

There is no quality loss when H.264 content is stored in FLV. Bit-wise the data is exactly identical. There is a slight overhead in file size when this data is stored in FLV format.

As part of the smoothflow workflow, three different types of metadata specifications are used that are related to the content provider/publisher, MFD, and the client player. The following text describe the details of:
Customer Media Asset Description Specification
Nokeena Internal Specification
Client Player XML Meta Data Specification The Media Asset needs to be ingested into the MFD system to enable smoothflow-based delivery, either via the pre-stage mechanism or through the cache miss mechanism. Since a media asset in the smoothflow case is a group of video sequences in different bit rates, there should be standardization with respect to naming them and grouping them. The owner of the asset publishes additional metadata as to aid in the pre-processing and delivery process. The metadata can be published as a simple text file in the following format:

```
Version: major.minor
Streams: 3
KeyFrameInterval: 'n' seconds
Frame Rate: 'x' fps
Sequence duration: 'n' seconds
Video Encoding Format: {.236 | VP6 | .264 }
Audio Encoding Format: { .aac | .mp3 }
Container Format: { .flv | .mp4 }
Rate: Br1 <kbps>
URI: http://media<dot>nokeena<dot>com/foo_p01.flv
Rate: Br2 <kbps>
URI: http://media<dot>nokeena<dot>com/foo_p02.flv
Rate: Br3 <kbps>
URI: http://media<dot>nokeena<dot>com/foo_p03.flv
```

The metadata file can contain the following pieces of information:
Number of Profiles/Streams
Total bit rate of each stream <Br (kbps)>
URI for each stream
Key Frame Interval (n secs)
The above example uses FLV as an example, but MP4 is supported as well.

Figure 21:
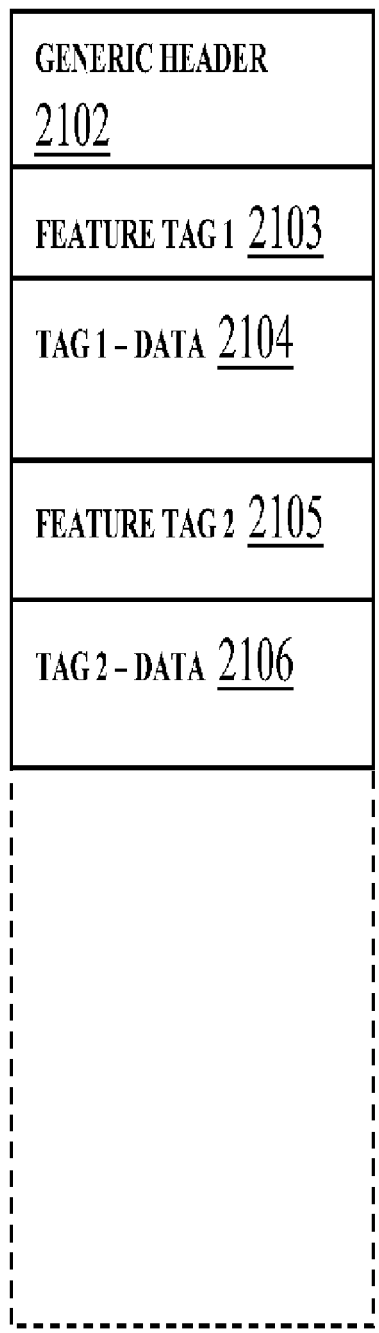
FIG. 21 illustrates an internal file structure, according to an embodiment of the invention.

Referring to FIG. 21, in a possible embodiment, the pre-processing engine prepares the input video data to support various features like smoothflow. The pre-processing includes re-formatting content and adding feature specific metadata.

Each feature has a tag header which can have all fields that are required for that feature and offsets to data sets that it may require. The data can be guided by a generic header 2102 at the top of the file. The header has information as to the number of features supported in a specific metadata file with their feature identifiers. This information can be directly used to move quickly to a required feature tag and, from there, to the data set.

| Generic Header 2102 | | |
|---|---|---|
| Field | Data Type | Comments |
| nkn_signature | UI64 | Signature |
| nkn_n_features | UI32 | Number of features supported |
| feature_table [nkn_n_features] | nkn_feature_table | Feature table stores feature access points |

| Feature Table (nkn_feature_table) | | |
|---|---|---|
| Field | Data Type | Comments |
| nkn_feature_id | UI32 | Identifier for feature '0' for SmoothFlow '1' for TrickPlay '2' for Logical Chunking |
| nkn_feature_tag_offset | U64 | Byte offset to the feature tag |

| Feature TAG 2103, 2105 | | |
|---|---|---|
| Field | Data Type | Comments |
| nkn_feature_id | UI32 | Copy of the same field in feature table; provided for tag by tag parsing support |
| nkn_tag_body_size | UI32 | Size of the tag body 2104, 2106 |
| Feature specific Tag Data | | |

Feature Tags

| Field | Data Type | Comments |
| --- | --- | --- |
| | Smooth Flow | |
| Version | UI32 | Version of the Smooth Flow pre-processing and delivery engine |
| profiles | UI32 | Number of Profiles |
| Keyframe period | UI32 | Distance between I-Frames in timescale (milliseconds) |
| Sequence duration | UI32 | Sequence Duration (milliseconds) |
| Profile rates [MAX_PROFILES] | UI32 array | Bitrates for each profile (kbps) And MAX_PROFILES is fixed at 16 entries |
| AFR Table [MAX_PROFILES] | UI32 array | Upper limit AFR for each profile. MFD will send the data at this rate. This will be important for the client to detect if it can upgrade the profile. If the data is always served at the lower limit then the client will never know when to upgrade |
| Chunk duration | UI32 | Duration between profile update points |
| Number of chunks | UI32 | Total number of chunks in the file each of period 'Chunk Duration' |
| Pseudo content length | UI32 | The maximum possible data length that will be sent on the wire for a multi bitrate media asset. (usually the size of the maximum bitrate) |

Client Player XML Meta Data Specification

An example of the schema for the client metadata specification is shown below:

```
<xml>
<sf_version> Major.Minor </sf_version>
<n_profiles> N </n_profiles>
<profile_map>
    <profile_name> p1 </profile_name>
    <br> B </br> !<-- in kbps >
</profile_map>
<profile_map>
    <profile_name> p2 </profile_name>
    <br> B </br> !<-- in kbps >
</profile_map>
<profile_map>
    <profile_name> p3 </profile_name>
    <br> B </br> !<-- in kbps >
</profile_map>
    .
    .
    .
</xml>
```

| Field Name | Comments |
| --- | --- |
| sf_version | Version of Smooth Flow being used in MFD |
| n_profiles | Number of available profiles for a given media asset |
| profile_name | Identifier string for a profile, this needs to be sent if the client wants to request a specific profile |
| br | Bitrate of the profile |

Dynamic Creation of Smoothflow Files

Figure 22:
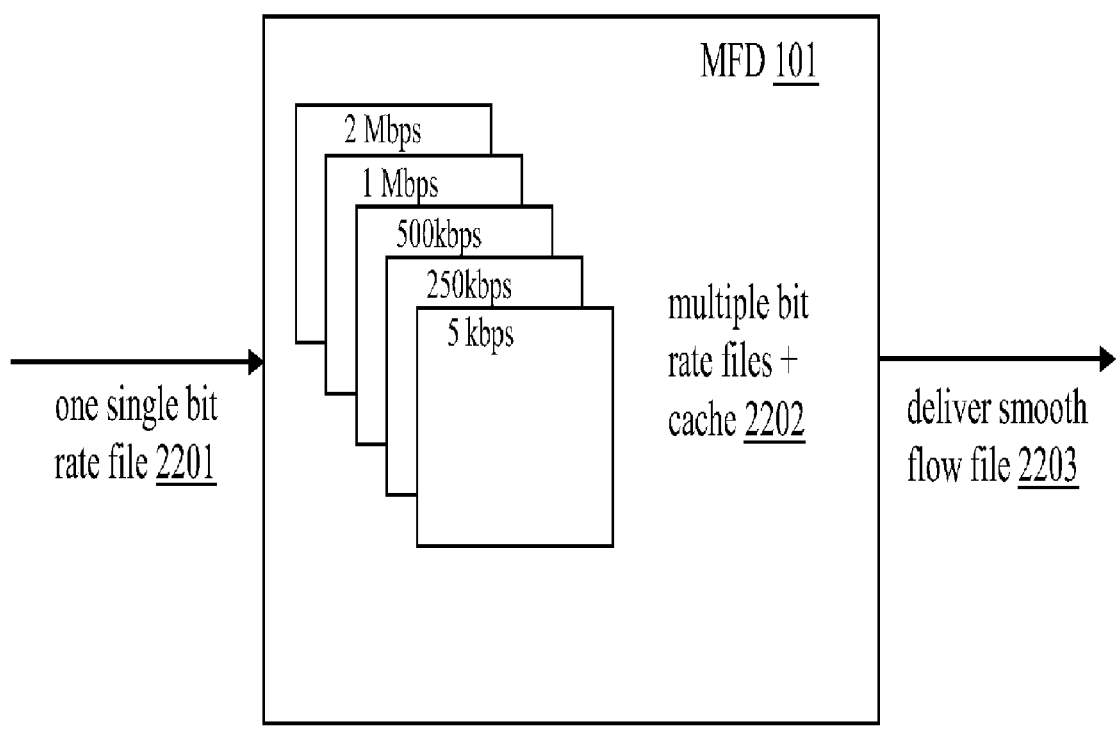
FIG. 22 illustrates an MFD caching multiple bit rate files, according to an embodiment of the invention.

The MFD has the ability to dynamically transcode or transrate content files for multiple bit rates in real time and on-demand. In the discussion below, transcoding is discussed in detail, however, transrating can be used in place of, or in combination with, transcoding. Referring to FIG. 22, in a possible embodiment, the MFD 101 transcodes multiple bit rate streams in real time, during delivery. The MFD 101 receives a high-quality single bit rate content file 2201 and stores the single bit rate content file in at least one local storage device. The single bit rate content file may be sent to the MFD 101 by an origin server, a content provider, a peer MFD, etc. In a possible embodiment, the MFD 101 monitors demand for the single bit rate content file. If the MFD 101 determines that the single bit rate content file is hot, the MFD 101 automatically transcodes content files for multiple bit rates 2202 in real time. In a possible embodiment, the MFD 101 transcodes content files from the single bit rate content file for a fixed set of bit rates. The bit rates can be a set of popular bit rates. In another possible embodiment, the MFD 101 can transcode content files for bit rates that it has received requests for. In either case, the transcoded bit rate content files are stored in at least one local storage device or in cache memory and are used to serve requests.

When a request for the content is received by the MFD 101, the MFD 101 searches its cache memory (or at least one storage device) for the cached bit rate content file that is appropriate for the request and serves the appropriate bit rate content file (smoothflow file) 2203. The MFD 101 functions can be performed in an origin or edge server, for example.

Figure 23:
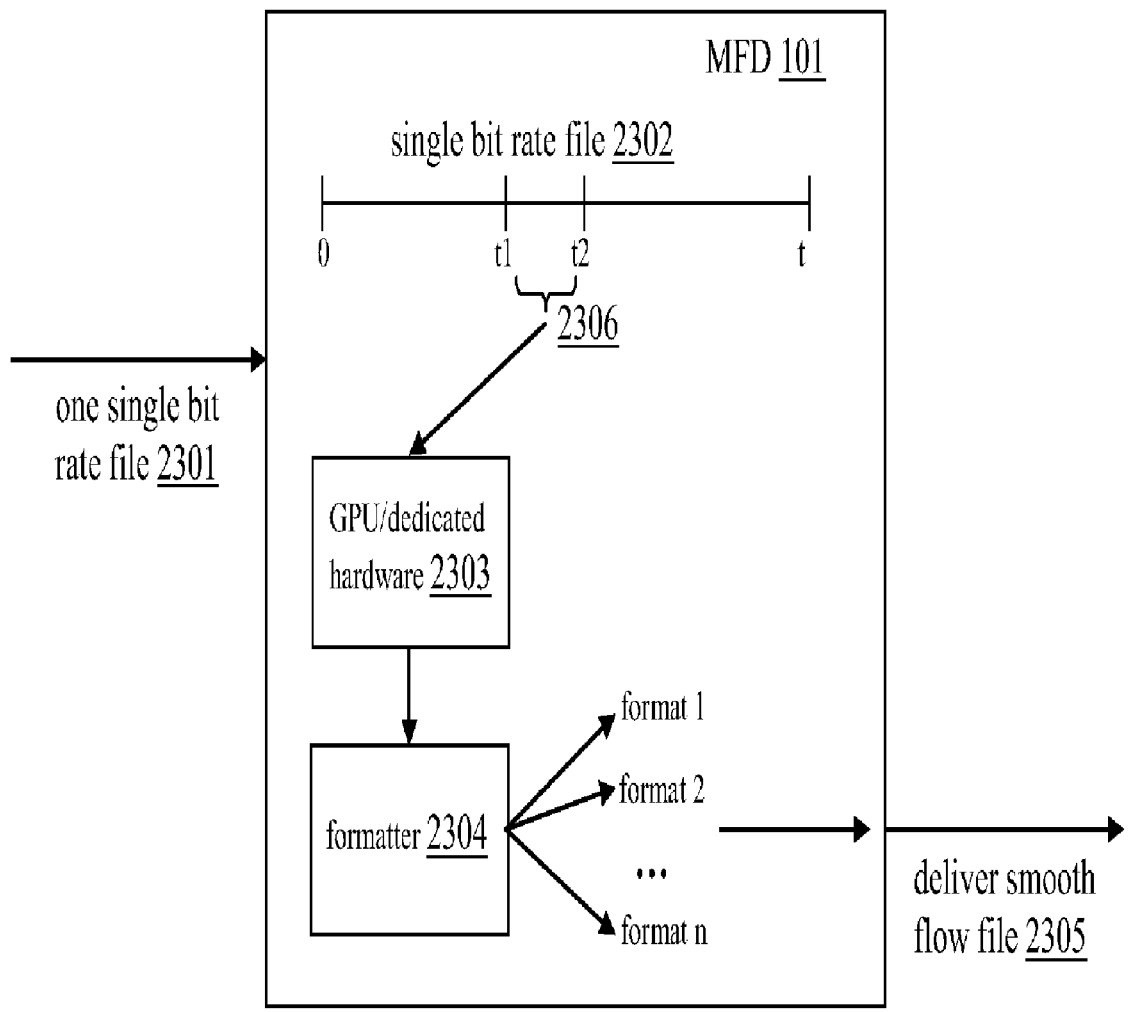
FIG. 23 illustrates an MFD dynamically creating bit rate specific files from a single bit rate file in response to segment requests, according to an embodiment of the invention.

Referring to FIG. 23, in a possible embodiment, the MFD 101 dynamically transcodes segments (or chunks) of content files. The MFD 101 receives a high-quality single bit rate content file 2301 and stores the single bit rate content file in at least one local storage device. The single bit rate content file may be sent to the MFD 101 by an origin server, a content provider, a peer MFD, etc. The MFD 101 serves the single bit rate content file 2302 to clients as the content requests are received. In a possible embodiment, the MFD 101 receives a request for a segment 2306 of the single bit rate content file 2302 that is at a different bit rate than the single bit rate content file is coded at. The MFD 101 may also, or alternatively, receive a request from a client for a certain bit rate for the content and then determine the segment 2306 of the single bit rate content file that is to be transcoded for that bit rate. In a possible embodiment, the MFD 101 can automatically detect a change in the available bit rate for the client (as discussed above) and determine the bit rate that the segment 2306 is to be transcoded to. The segment 2306 can be natively transcoded or sent to a GPU or dedicated hardware 2303 to be transcoded to the requested bit rate. The GPU or dedicated hardware 2303 transcodes the segment 206 to the requested bit rate. The transcoded segment is sent to a formatter 2304. The formatter 2304 has the ability to format the transcoded segment to a variety of media container formats, for example, formats specifically used for certain cellular phones or client software (e.g., fragmented mp4 files, segmented mpeg-ts chunks, etc.), etc. The MFD 101 can automatically detect the format needed by the client in several ways. The MFD 101 can detect the type of client via the client's request which is typically unique to the client. The MFD 101 can also detect the client via the format of the request which is unique to the client type, e.g., the URL format, etc. The formatter 2304 creates the formatted segment for the client and the formatted segment is delivered to the client 2305.

As an example, if the single bit rate content file is a 2 Mbps file. The MFD 101 receives a request from a client for a 200 kbps segment of the single bit rate content file that starts at time t1 and ends at time t2. The start time t1 and the end time t2 can be on chunk boundaries or dynamically defined by the MFD 101. The MFD 101 sends the segment to the formatter 2304. The MFD 101 has detected that the client is a particular device of type X. The MFD 101 looks up type X in a table, database, data structure, etc., and discovers that the device characteristics and that the device requires fragmented mp4 files. The formatter 2034 formats the transcoded segments at the requested bit rate as fragmented mp4 files. The MFD 101 delivers the formatted segment to the client.

Figure 24:
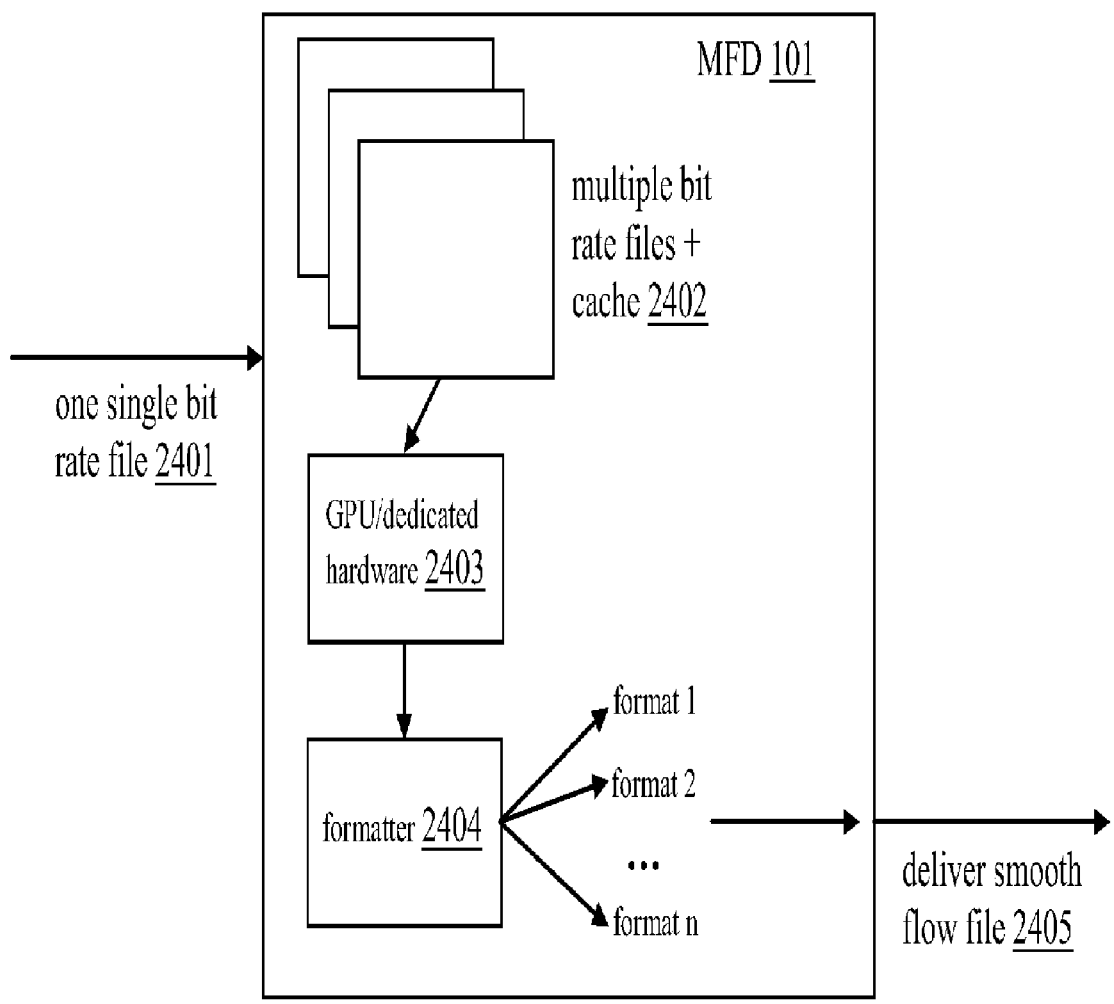
FIG. 24 illustrates an MFD caching multiple bit rate files and dynamically creating bit rate specific files from one of the cached multiple bit rate files, according to an embodiment of the invention.

FIG. 24 illustrates a combination of FIGS. 22 and 23. In this example, the MFD 101 receives a high-quality single bit rate content file 2401 and stores the single bit rate content file in at least one local storage device. The MFD 101 transcodes the single bit rate content file for a set number of bit rates (e.g., three or four). The bit rates may be popular bit rates that are typically requested for that type of content. The MFD 101 stores the transcoded content files in at least one local storage device or in cache memory. The MFD 101 serves the transcoded content files and/or the single bit rate content file to requesting clients. When a client requests a bit rate (or the MFD 101 detects a bit rate change for the client) that is different than the bit rates of the stored transcoded content files or the single bit rate content file, the MFD 101 sends the segment of the transcoded content file or single bit rate content file that is closest to the new bit rate to the GPU or dedicated hardware 2403. This reduces the amount of computing resources needed to create the content file transcoded for the new bit rate. The GPU or dedicated hardware 2403 transcodes the segment to the new bit rate. The transcoded segment is sent to the formatter 2404.

The formatter 2404 formats the transcoded segment to the required format for the client. The formatted segment is delivered to the client. The formatted segment can be stored in cache memory for future client requests. In a possible embodiment, the MFD 101 can also have the formatter 2404 format the transcoded segment for other popular formats. The MFD 101 can store the formatted segments in cache memory for future client requests. The decision to store the formatted segments in cache memory may be dependent upon the desire for client response speed or memory conservation. If client response speed is a concern and memory conservation is not, then the formatted segments can be stored in cache memory. If memory conservation is a concern, then the formatting of the additional segments is not performed and the formatted segment is not stored in the cache memory and is discarded once delivered to a client.

Figure 25:
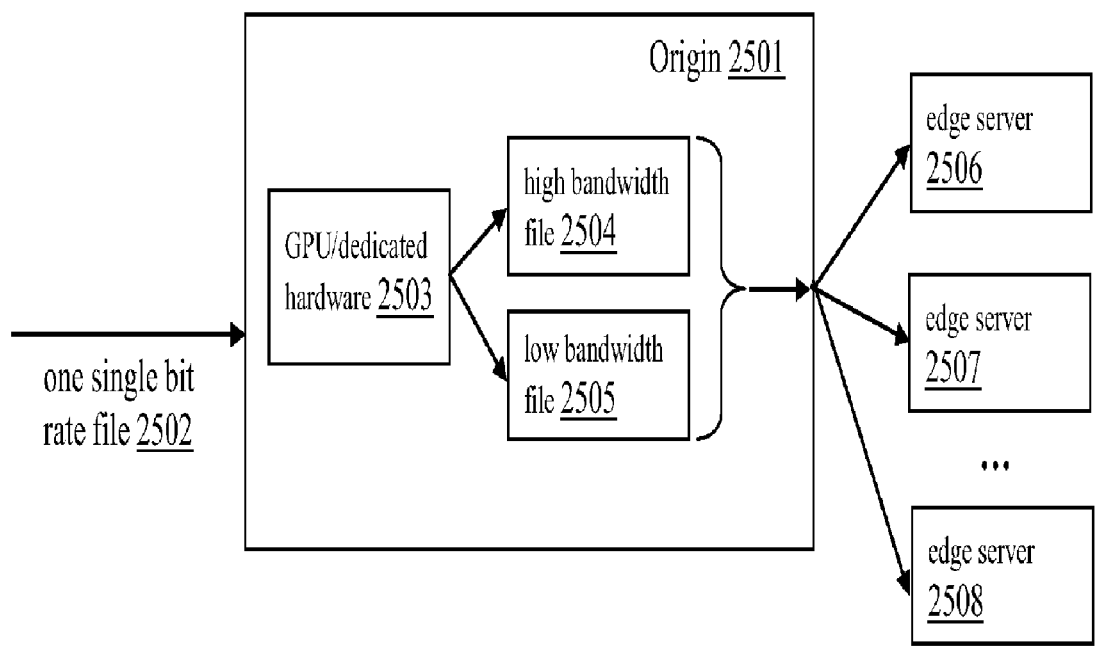
FIG. 25 illustrates an origin server sending two bit rate files to edge servers, according to an embodiment of the invention.

Referring to FIG. 25, in a possible embodiment, transcoding can be made more efficient for edge servers by having an edge server transcode content files to two or more bit rates that are sufficiently different in bit rate that the edge servers can select which transcoded content file to use to further transcode the file to a lower bit rate. An origin server 2501 receives a single bit rate file 2502 from a source such as a content provider. The origin server 2501 sends the single bit rate content fie to a GPU or dedicated hardware 2503 for transcoding. The GPU or dedicated hardware transcodes the single bit rate content file into two or more bit rate content files. As an example, when a content file is transcoded for two bit rates, the bit rates are selected to be sufficiently different so that an edge server can conserve computing resources if it selects a first transcoded content file over a second transcoded content file to base its transcoding for a third bit rate. The resulting transcoded content files for a high bit rate 2504 and a low bit rate 2506 are delivered to multiple edge servers 2506, 2507, 2509. The edge servers 2506, 2507, 2509, use the high bit rate content file and the low bit rate content file as the basis for their transcoding of the content files to other bit rates. For example, in a scenario where the high bit rate content file is trancoded for 4 Mbps and the low bit rate content file is transcoded for 500 kbps, an edge server receives a request for the content at 200 kbps. The edge server determines that the 500 kbps file is closer to the 200 kbps request. The edge server uses the 500 kbps file to transcode to 200 kbps, thus conserving computing resources on the edge server.

3.0 Implementation Mechanisms

Hardware Overview

Figure 6:
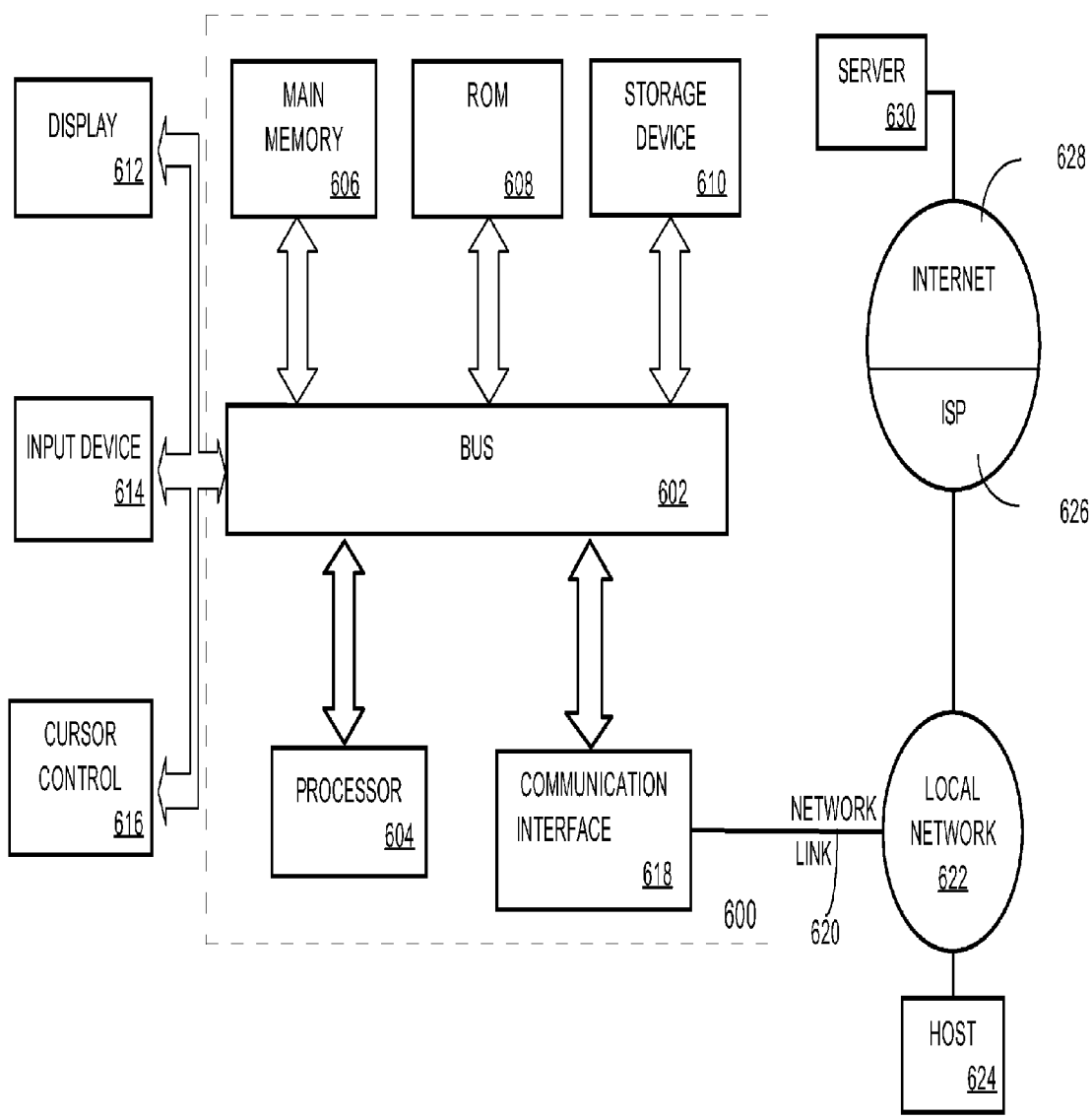
FIG. 6 illustrates a computer system upon which a possible embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

4.0 Examples

In an embodiment, a method comprises or a computer-readable storage medium carrying one or more sequences of instructions, wherein execution of the one or more sequences of instructions by one or more processors causes the one or more processors to perform the steps of: receiving, by a server, a content file encoded for a first bit rate, receiving, by the server, a client's request for the content file encoded for a second bit rate that is different from the first bit rate, in response to receiving the request, determining, by the server, a segment of the content file to be transcoded to the second bit rate, transcoding, by the server, the segment to the second bit rate, delivering the transcoded segment to the client.

In an embodiment, a method or computer-readable storage medium further comprises determining, by the server, a file format required by the client; formatting, by the server, the transcoded segment to the file format required by the client.

In an embodiment, a method or computer-readable storage medium further comprises deleting, by the server, the transcoded segment after the transcoded segment has been delivered to the client.

In an embodiment, a method comprises or a computer-readable storage medium carrying one or more sequences of instructions, wherein execution of the one or more sequences of instructions by one or more processors causes the one or more processors to perform the steps of: receiving, by a server, a content file encoded for a first bit rate; transcoding, by the server, the content file to a plurality of content files of differing bit rates; storing the plurality of content files of differing bit rates in at least one storage device in communication with the server; receiving, by the server, a client's request for the content file encoded for a second bit rate that is different from the first bit rate and the bit rates of the plurality of content files of differing bit rates; in response to receiving the request, determining, by the server, a segment of one of the plurality of content files of differing bit rates to be transcoded to the second bit rate; transcoding, by the server, the segment to the second bit rate; delivering the transcoded segment to the client.

In an embodiment, a method or computer-readable storage medium further comprises determining, by the server, a file format required by the client; formatting, by the server, the transcoded segment to the file format required by the client.

In an embodiment, a method or computer-readable storage medium further comprises deleting, by the server, the transcoded segment after the transcoded segment has been delivered to the client.

In an embodiment, an apparatus comprises: a content file receiver, on a server, that receives a content file encoded for a first bit rate; a content file request receiver, on the server, that receives a client's request for the content file encoded for a second bit rate that is different from the first bit rate; a segment determination subsystem, on the server, that, in response to receiving the request, determines a segment of the content file to be transcoded to the second bit rate; a transcoding subsystem, on the server, that transcodes the segment to the second bit rate; a segment delivery subsystem that delivers the transcoded segment to the client.

In an embodiment, an apparatus further comprises determining, by the server, a file format required by the client; formatting, by the server, the transcoded segment to the file format required by the client.

In an embodiment, an apparatus further comprises deleting, by the server, the transcoded segment after the transcoded segment has been delivered to the client.

In an embodiment, an apparatus comprises: a content file receiver, on a server, that receives a content file encoded for a first bit rate; a content file request receiver, on the server, that receives a client's request for the content file encoded for a second bit rate that is different from the first bit rate; a segment determination subsystem, on the server, that, in response to receiving the request, determines a segment of the content file to be transcoded to the second bit rate; a transcoding subsystem, on the server, that transcodes the segment to the second bit rate; a segment delivery subsystem that delivers the transcoded segment to the client.

In an embodiment, an apparatus further comprises determining, by the server, a file format required by the client; formatting, by the server, the transcoded segment to the file format required by the client.

In an embodiment, an apparatus further comprises deleting, by the server, the transcoded segment after the transcoded segment has been delivered to the client.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   storing, by a server, a content file transcoded at a plurality of bit rates;
   receiving, by the server, a request, from a client device, for the content file;
   determining, by the server, a bit rate associated with the request for the content file;
   determining, by the server, a segment of the content file to be transcoded to the determined bit rate;
   determining, by the server, that the determined bit rate does not match any of the plurality of bit rates;
   determining, by the server and based on determining that the determined bit rate does not match any of the plurality of bit rates, one of the plurality of bit rates that is closest to the determined bit rate;
   transcoding, by the server and using the content file transcoded at the closest one of the plurality of bit rates, the segment to the determined bit rate; and
   outputting, by the server, the transcoded segment to the client device.

2. The method of claim 1, further comprising:
   automatically determining the bit rate associated with the request for the content file.

3. The method of claim 2, where the bit rate associated with the request for the content file is automatically determined based on a type of the client device.

4. The method of claim 2, where the bit rate associated with the request for the content file is automatically determined based on a format associated with the request.

5. The method of claim 1, where, when determining the bit rate associated with the request for the content file, the method further comprises:
   determining a type of the client device;
   retrieving, from a memory, one or more characteristics associated with the type of the client device;
   determining, based on the retrieved one or more characteristics, that the client device requires a particular type of transcoded content file; and
   determining, based on the particular type of transcoded content file, the bit rate.

6. The method of claim 1, further comprising:
   transcoding the content file at the plurality of bit rates, the plurality of bit rates being associated with a plurality of popular bit rates.

7. The method of claim 1, further comprising:
   storing the transcoded segment.

8. A device comprising:
   a processor to:
      receive a request, from a client device, for a content file;
      determine a bit rate associated with the request for the content file;
      determine a segment of the content file to be transcoded to the determined bit rate;
      determine that the determined bit rate does not match any of a plurality of bit rates;
      determine, based on determining that the determined bit rate does not match any of the plurality of bit rates, one of the plurality of bit rates that is closest to the determined bit rate;
      transcode, using a content file transcoded at the closest one of the plurality of bit rates, the segment to the determined bit rate; and
      output the transcoded segment to the client device.

9. The device of claim 8, where the processor is further to:
   automatically determine the bit rate associated with the request for the content file.

10. The device of claim 9, where the bit rate associated with the request for the content file is automatically determined based on a type of the client device.

11. The device of claim 9, where the bit rate associated with the request for the content file is automatically determined based on a format associated with the request.

12. The device of claim 8, where, when determining the bit rate associated with the request for the content file, the processor is further to:
   determine a type of the client device;
   retrieve, from a memory, one or more characteristics associated with the type of the client device;
   determine, based on the retrieved one or more characteristics, that the client device requires a particular type of transcoded content file; and
   determine, based on the particular type of transcoded content file, the bit rate.

13. The device of claim 8, where the processor is further to:
   transcode the content file at the plurality of bit rates, the plurality of bit rates being associated with a plurality of popular bit rates.

14. The device of claim 8, where the processor is further to:
   store the transcoded segment.

15. A system comprising:
   one or more devices to:
      store a content file transcoded at a plurality of bit rates;
      receive a request, from a client device, for the content file encoded for a first bit rate;
      determine, based on receiving the request, a segment of the content file to be transcoded to the first bit rate;
      determine that the determined bit rate does not match any of the plurality of bit rates;
      determine, based on determining that the determined bit rate does not match any of the plurality of bit rates, one of the plurality of bit rates that is closest to the determined bit rate;

transcode, using the content file transcoded at the closest one of the plurality of bit rates, the segment to the determined bit rate; and output the transcoded segment to the client device.

16. The system of claim 15, where the one or more devices are further to:

determine a type of format for the transcoded segment based on a type of the client device.

17. The system of claim 15, where the one or more devices are further to:

delete the transcoded segment after outputting the transcoded segment to the client device.

18. The system of claim 15, where the one or more devices are further to:

transcode the content file at the plurality of bit rates, the plurality of bit rates being based on previous bit rate requests associated with the content file.

19. The system of claim 15, where the one or more devices are further to:

transcode the content file at the plurality of bit rates, the plurality of bit rates being associated with a plurality of popular bit rates.

20. The system of claim 15, where the one or more devices are further to:

store the transcoded segment.

* * * * *